United States Patent
Nakazato

(10) Patent No.: US 7,526,612 B2
(45) Date of Patent: Apr. 28, 2009

(54) MULTIPORT CACHE MEMORY WHICH REDUCES PROBABILITY OF BANK CONTENTION AND ACCESS CONTROL SYSTEM THEREOF

(75) Inventor: Satoshi Nakazato, Tokyo (JP)

(73) Assignee: NEC Corporation, Tokyo (JP)

( * ) Notice: Subject to any disclaimer, the term of this patent is extended or adjusted under 35 U.S.C. 154(b) by 413 days.

(21) Appl. No.: 11/269,716

(22) Filed: Nov. 9, 2005

(65) Prior Publication Data
US 2006/0101207 A1 May 11, 2006

(30) Foreign Application Priority Data
Nov. 10, 2004 (JP) ............................ 2004-326740

(51) Int. Cl.
*G06F 13/00* (2006.01)
(52) U.S. Cl. ................................. 711/131; 365/230.05
(58) Field of Classification Search ................. 711/131; 365/230.05
See application file for complete search history.

(56) References Cited

U.S. PATENT DOCUMENTS

| 2001/0029571 | A1* | 10/2001 | Shibayama | 711/118 |
| 2002/0108021 | A1* | 8/2002 | Syed et al. | 711/128 |
| 2005/0240733 | A1* | 10/2005 | Luick | 711/137 |
| 2006/0059312 | A1* | 3/2006 | Peled et al. | 711/137 |

FOREIGN PATENT DOCUMENTS

| JP | 63-201851 A | 8/1988 |
| JP | 6-139144 A | 5/1994 |

\* cited by examiner

*Primary Examiner*—Reba I Elmore
(74) *Attorney, Agent, or Firm*—Sughrue Mion, PLLC

(57) ABSTRACT

A multiport cache memory is provided which enables reduction of a probability of bank contention which will occur when a plurality of read operations are executed simultaneously, and an access control system of the multiport cache memory.

32 Claims, 13 Drawing Sheets

MULTIPORT CACHE MEMORY WHICH REDUCES PROBABILITY OF BANK CONTENTION AND ACCESS CONTROL SYSTEM THEREOF

BACKGROUNDS OF THE INVENTION

1. Field of the Invention

The present invention relates to a cache memory and, more particularly, a multiport cache memory which enables reduction of a probability of bank contention which will occur when a plurality of reading processings are executed simultaneously and an access control system of the multiport cache memory.

2. Description of the Related Art

In a multiport cache memory which simultaneously executes a plurality of reading processings, a method using a conventional bank structure has a shortcoming of a high probability of bank contention which disables simultaneous execution of a plurality of reading processings.

On the other hand, reducing a probability of occurrence of bank contention leads to an increase in an area of a cache memory mounted on large-scale intergration LSI chip to invite reduction of an operating frequency which is caused by a propagation delay increase due to an increase in a signal wiring length, cost increase due to an increase in LSI size, an increase in power consumption and the like.

Recent superscalar processors and the like are designed to issue a plurality of load/store instructions simultaneously. An operand cache memory therefore has a multiport structure to process these plurality of load/store instructions. In particular, for improving performance at the time of execution of an application at a processor, that is, for improving effective performance, simultaneous execution of a plurality of load instructions is required and as an operand cache memory, simultaneous execution of a plurality of reading processings is demanded. A multiport cache memory which realizes simultaneous execution of a plurality of reading processings can be embodied in several forms. Three examples will be described in the following.

System 1: A system in which a data array has a bank structure by using a one-port RAM (Random Access Memory) to make a multiport access unless bank contention occurs.

System 2: A system in which, with a cache memory multiplexed which has a port access structure, the same data is written to all the cache memories at the time of execution of a store instruction and different data is read from each cache memory at the time of execution of a load instruction, thereby making a multiport access.

System 3: A system which, with a memory cell itself for use as a cache memory used as a multiport RAM cell, each of cache memory components such as an address decoder and a sense amplifier is provided in the plural to make a multiport access.

FIG. 9 is a block diagram showing a structure of the System 1 of a multiport cache memory. Here, description will be made of an operand cache memory which executes two reading processings at the same time.

Premised as an operand cache memory here is a set-associative system and shown in FIG. 9 is an example of a two-way set-associative system based structure.

Provided are latches 10 and 11 which hold two different access addresses 900-0 and 900-1 and the addresses are each divided into three, a tag part, an index part and a block part sequentially from the higher-order bit (MSB (Most Significant Bit)).

Tag parts 901-0 and 901-1 are sent to tag address comparators 920-0 and 920-1 for the comparison with addresses registered at address arrays 910-0 and 910-1 and index parts 902-0 and 902-1 become addresses read from the address arrays 910-0 and 910-1.

Registered addresses 911-0 and 911-1 read from the address arrays 910-1 and 910-1 and the tag parts 901-0 and 901-1 are compared at the tag address comparators 920-0 and 920-1 to generate cache hit determination signals 921-0 and 921-1 depending on whether the compared values coincide with each other or not.

The address arrays 910-0 and 910-1 are duplexed to have a copy of the same contents so as to correspond to the two access addresses 900-0 and 900-1, respectively, and registered tag address updating information 912 as data to be written to the address arrays 910-0 and 910-1 is simultaneously applied to the two address arrays 910-0 and 910-1 and updated simultaneously.

The tag address comparators 920-0 and 920-1 are also duplexed to execute comparison processing corresponding to the two access addresses 900-0 and 900-1, respectively.

Data arrays 970-0, 970-1, 970-2 and 970-3 are divided into a plurality of banks according to block part lower-order bits 904-0 and 904-1 of the addresses.

FIG. 9 shows a structure of a data array divided into four banks with the number of bits as two. Addresses 903-0 and 903-1 respectively obtained by combining the block part and the index part excluding the lower-order bits 904-0 and 904-1 become addresses for reading the data arrays 970-0, 970-1, 970-2 and 970-3. After passing through selectors 960-0, 960-1, 960-2 and 960-3 which, for their data arrays, select from which of two-line access addresses an access is made, the addresses 903-0 and 903-1 become addresses 961-0, 961-1, 961-2 and 961-3 for reading the data arrays 970-0, 970-1, 970-2 and 970-3.

The block part lower-order bits 904-0 and 904-1 are applied to decoders 930-0 and 930-1, respectively, and their decode signals 931-0 and 931-1 become selection control signals for selectors 980-0 and 980-1 which select read data 971-0, 971-1, 971-2 and 971-3 from the respective data arrays 970-0, 970-1, 970-2 and 970-3 divided into banks.

Outputs from the data selectors 980-0 and 980-1 which read the data arrays become target data 981-0 and 981-1 in the operand cache memory corresponding to the two different access addresses 900-0 and 900-1, respectively.

A comparison result signal 941 obtained by applying the decode signals 931-0 and 931-1 and the respective block part lower-order bits 904-0 and 904-1 to a comparator 940 is applied to a selection control signal generation circuit 950 for generating selection control signals 951-0, 951-1, 951-2 and 951-3 to the data array read address selectors 960-0, 960-1, 960-2 and 960-3.

Because when the comparison result signal 941 obtained from the block part lower-order bits 904-0 and 904-1 indicates lack of coincidence, the two different access addresses 900-0 and 900-1 are allowed to execute processing of reading from data arrays of different banks, the selection control signal generation circuit 950 outputs appropriate values for data array reading address information selection control signals 951-0, 951-1, 951-2 and 951-3 according to the decode results 931-0 and 931-1 of the block part lower-order bits 904-0 and 904-1.

On the other hand, when the comparison result signal 941 indicates coincidence, because the two different access addresses 900-0 and 900-1 need to execute processing of reading from the data array of the same bank, bank contention will occur. In this case, output appropriate values for the address information selection control signals 951-0, 951-1, 951-2 and 951-3 for reading the data array such that read is executed from one access address by invalidating processing of reading from another access address according to priority.

As described in the foregoing, since according to the system, two operand cache reading processings are executed simultaneously, the system can be realized only by duplexing of an address array and addition of some amount of peripheral logic to enable an increase in an area of a memory mounted on an LSI to be minimized.

FIG. 10 is a block diagram showing a structure of the System 2 of a multiport cache memory.

The system 2 includes latches 10 and 11 which hold two different access addresses 1000-0 and 1000-1, tag parts 1001-0 and 1001-1 and index parts 1002-0 and 1002-1 of the access addresses, address arrays 1010-0 and 1010-1, registered addresses 1011-0 and 1011-1 read from the address arrays 1010-0 and 1010-1, tag address comparators 1020-0 and 1020-1, cache hit determination signals 1021-0 and 1021-1 and registered tag updating data 1012 to the address arrays 1010-0 and 1010-1.

In a case of the system 2, similarly to the address arrays 1010-0 and 1010-1, data arrays 1070-0 and 1070-1 are duplexed to have a copy of the same contents so as to correspond to the two different access addresses 1000-0 and 1000-1, respectively.

Write data as data to be written to the data arrays 1070-0 and 1070-1 and cache fill data 1072 for updating cache memory registered data (hereinafter referred to as write data/fill data) are simultaneously applied to the two data arrays 1070-0 and 1070-1 and updated simultaneously. Addresses 1003-0 and 1003-1 respectively obtained by combining the index parts and the block parts of the two different access addresses 1000-0 and 1000-1 are applied as index addresses to their corresponding data arrays 1070-0 and 1070-1 and read as necessary target data 1071-0 and 1071-1 to execute two reading processings simultaneously.

Unlike the system 1 shown in FIG. 9, the system 2 allows an operand cache memory to be formed which is capable of executing two reading processings at the same time in every case.

FIG. 11 is a block diagram showing a structure of the System 3 of a multiport cache memory.

The system 3 includes latches 10 and 11 which hold two different access addresses 1100-0 and 1100-1, tag parts 1101-0 and 1101-1 and index parts 1102-0 and 1102-1 of the addresses, address arrays 1010-0 and 1010-1, registered addresses 1111-0 and 1111-1 read from the address arrays 1010-0 and 1010-1, tag address comparators 1120-0 and 1120-1, cache hit determination signals 1121-0 and 1121-1 and a registered tag updating data 1112 to the address arrays 1010-0 and 1010-1.

The registered tag updating data 1112 and cache fill data 1172 are the same as in a case of the System 2.

The System 3 is formed of a two-port RAM cell capable of processing two accesses simultaneously unlike an ordinary memory cell.

Addresses 1103-0 and 1103-1 respectively obtained by combining the index parts and the block parts of the two different access addresses 1100-0 and 1100-1 are directly applied to two ports of a data array 1170-0 and read data 1171-0 and 1171-1 are output to their corresponding ports to become target data from the cache memory.

Here, description will be made of a two-port RAM cell as a main component of the system 3 in comparison with ordinary RAM cells of the Systems 1 and 2.

FIG. 12 is a diagram showing a structure of an ordinary RAM cell used in the data arrays in FIG. 9 and FIG. 10.

Data holding at the RAM cell is executed by connecting two inverters 1200 and 1210 in a loop. Connected to the outside of the loop are two switching transistors 1220-0 and 1220-1 controlled by a word line 1221.

When the word line 1221 enters a selected state, the two switching transistors 1220-0 and 1220-1 are rendered conductive, so that data held at the two inverters 1200 and 1210 are output onto data read signal lines referred to as bit lines 1222-0 and 1222-1.

At this time, read data appearing on the respective bit lines 1222-0 and 1222-1 are signals whose logic is inversion to each other. For mounting such a RAM cell on an LSI, it is a common practice to form a RAM cell by a smaller area with standards such as a dimension, a wiring width and a wiring interval of a transistor element called design rules defined separately from a wiring of a transistor forming an ordinary logic circuit.

FIG. 13 is a diagram showing a structure of a two-port RAM cell for use in the data array of FIG. 11.

The structure is the same as that of the RAM cell shown in FIG. 12 in that with two inverters 1300 and 1310 for holding data at the RAM cell connected in a loop, two switching transistors 1320-0 and 1320-1 are connected which are controlled by a word line 1321 to read data to bit lines 1322-0 and 1322-1.

In the two-port RAM cell illustrated in FIG. 13, however, other two switching transistors 1330-0 and 1330-1 controlled by another word line 1331 are connected to the two inverters 1300 and 1310 connected in a loop. When the word line 1331 is selected, the two switching transistors 1330-0 and 1330-1 are rendered conductive to output data to other two bit lines 1332-0 and 1332-1.

As compared with the structure shown in FIG. 12, it can be found that the two-port RAM cell in FIG. 13 has an increase of two transistors, one lateral wiring (word line) and two vertical wirings (bit lines) per one RAM cell.

In addition, it is in general impossible to apply, to a two-port RAM cell, special design rules for reducing an area which is applicable to an ordinary RAM. As a result, an increase in a two-port RAM area is larger than an increase in the number of transistors and the number of wirings, so that the area will be approximately twice to two and a half that of an ordinary RAM cell in general.

Other than the above-described three systems, the System 1 to the System 3, examples of a method for solving the problem of bank contention occurrence are recited, for example, in Japanese Patent Laying-Open (Kokai) No. 1988-201851 (Literature 1) and Japanese Patent Laying Open (Kokai) No. 1994-139144 (Literature 2).

The method disclosed in Literature 1 relates to a storage system in a case where a plurality of requesting sources access a buffer storage at the same time, in which an address array is divided into a plurality of banks which are interleaved on a cache block basis. A data array is also divided into a plurality of banks which are interleaved on an access data width basis.

With such a structure, when a plurality of requesting sources make access requests whose address arrays and data arrays are different, the plurality of requesting sources can execute reading processing simultaneously.

The method recited in Literature 2 relates to a cache memory circuit coping with an access bridging over blocks, which, when the access bridges over a block, compares tag addresses of two bridging blocks to read two different blocks required at the same time according to a positional relationship between the two blocks.

The above-described conventional techniques have the following shortcomings.

First, description will be made of the Systems 1 to 3 and then of the methods recited in Literature 1 and Literature 2.

The system 1 is a method, with a data array designed to have a bank structure by using a one-port RAM cell, of making a multiport access unless bank contention occurs.

With the System 1, there occurs a case depending on an access address where simultaneous read is disabled due to bank contention in a data array. For reducing a probability of bank contention occurring, the number of bank divisions needs to be increased and in such a case, such problems arise as an increase in an area and an increase in a scale of peripheral logic due to a division loss caused by an increase in the number of data array divisions, and operating frequency reduction caused by an increase in a critical path delay due to complication of logic of a selector control circuit.

On the other hand, the System 2 is a method, with cache memories having a port access structure multiplexed, of writing the same data to all the cache memories when a store instruction is executed and reading different data from each cache memory when a load instruction is executed, thereby making a multiport access.

However, since a data array is completely duplexed which is a main component of an operand cache memory and occupies a large part of its area, an approximately twice an area is required as compared with a system of an ordinary structure. In addition, for executing two reading processing at the same time, a duplexed data array will continue operating, so that power consumption will be doubled.

The System 3 is a method of making a multiport access with a memory cell itself for use in a cache memory used as a multiport RAM cell and with each of cache memory components such as an address decoder and a sense amplifier provided in the plural.

The System 3 has a shortcoming that an area of a data array which is a main component of an operand cache memory and occupies a large part of its area is approximately twice to two and a half that of a system having an ordinary structure. Moreover, because an area of a RAM cell itself is increased, a word line laterally crossing all the RAM cells and a bit line vertically crossing all the RAM cells will be elongated to increase an access time of a data array. As a result, an operating frequency of the entire operand cache memory will be reduced.

Methods recited in Literature 1 and Literature 2 will be described.

The method in Literature 1 enables a plurality of requesting sources to execute reading processing simultaneously when the plurality of requesting sources make access requests whose address arrays and data arrays are both different, with the address array divided into a plurality of banks and the data array divided into a plurality of banks.

In a case of the method in Literature 1, however, when either the address arrays or the data arrays coincide with each other, one of the requests is kept waiting to prevent simultaneous execution of reading processing.

The method recited in Literature 2, which also relates to a cache memory circuit which copes with an access bridging over blocks, enables two different blocks to be read when an access bridges over blocks.

The method in Literature 2, however, is premised on one access request and is a method of coping with an access bridging over blocks, which fails to prevent bank contention when a read request is simultaneously made by a plurality of requesting sources.

SUMMARY OF THE INVENTION

An object of the present invention is to provide a multiport cache memory which solves the above-described shortcomings of conventional techniques and reduces a probability of occurrence of bank contention which occurs when a plurality of reading processings are executed simultaneously and an access control system of the multiport cache memory.

The present invention for achieving the above-described object is a multiport cache memory which, with cache block data registered in an address array and a data array as components of the cache memory indexed by a plurality of access addresses, executes processing of reading respective target data corresponding to the plurality of access addresses simultaneously, in which the address array and the data array are divided into a plurality of banks which can be unitarily identified by an index part lower-order bit of the access addresses.

The present invention is characterized in being a set-associative system cache memory in which the memory is divided into a plurality of blocks.

With degrees of coincidence between a tag part and an index part of a plurality of access addresses classified into cases, the present invention aims at reducing a probability of occurrence of bank contention in the respective cases.

More specifically, when tag parts and index parts of two-line access addresses whose reading processing is executed simultaneously coincide with each other, target data of the two-line access addresses are both in the same bank and in the same cache block. Accordingly, using an access address whose preset priority is high, read cache block data from a data array. No read is executed with respect to an access address whose priority is low.

Next, distribute cache block data read from the data array by using the access address whose priority is high to two-line reading ports to selectively output necessary target data from cache block data according to a block part of each access address.

Thus, even reading processing in the same bank, simultaneous execution is possible without bank contention.

In a case where tag parts of two-line access addresses whose reading processing is executed simultaneously show lack of coincidence and index parts coincide with each other, the data are in the same bank because of coincidence between the index parts. However, since the tag parts fail to coincide, the data will be set-associative system data in different cache sets in the same bank. Therefore, read cache block data respectively from two cache sets in the data array in the relevant bank.

Next, transfer the two cache block data respectively to reading ports corresponding to the respective access addresses to selectively output necessary target data according to a block part of each access address.

Thus, even reading processing in the same bank, simultaneous execution is possible without bank contention.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First Embodiment

Figure 1:
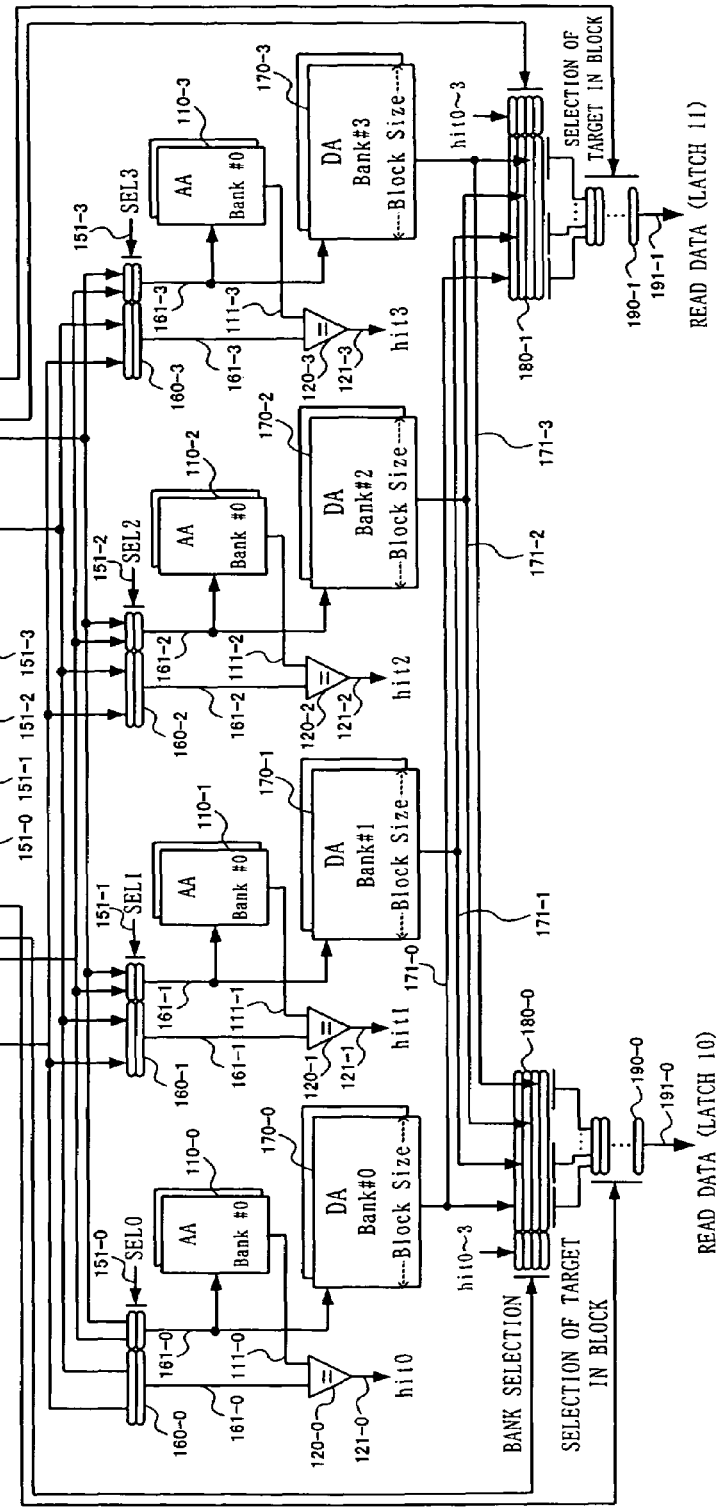
FIG. 1 is a block diagram showing a structure of a multiport cache memory according to a first embodiment of the present invention.

FIG. 1 is a block diagram showing a structure of a multiport cache memory according to the present embodiment.

With reference to FIG. 1, the multiport cache memory according to the present embodiment includes latches 10 and 11, comparators 140-0, 140-1 and 140-2, a selection control signal generation circuit 150, selectors 160-0, 160-1, 160-2 and 160-3, address arrays (AA) 110-0, 110-1, 110-2 and 110-3, tag address comparators 120-0, 120-1, 120-2 and 120-3, data arrays (DA) 170-0, 170-1, 170-2 and 170-3, bank selection circuits 180-0 and 180-1 and selection circuits 190-0 and 190-1.

The latches 10 and 11 are capable of holding access addresses 100-0 and 100-1, respectively, for accessing target data 191-0 and 191-1 as targets to be simultaneously read.

The access addresses 100-0 and 100-1 are divided into three from the higher-order bit (MSB (Most Significant Bit)), tag parts 101-0 and 101-1, index parts 102-0 and 102-1 and block parts 103-0 and 103-1, respectively.

The address arrays and the data arrays are both divided into banks by lower-order bits 104-0 and 104-1 of the index part.

The tag part address is registered in the address array.

The index part address becomes an entry address of the address array and the data array.

The block part address indicates a position of target data.

The index part lower-order address indicates a position of a bank.

FIG. 1 shows a case where with the lower-order bits 104-0 and 104-1 of the index part both having two bits, the arrays are formed of four banks. More specifically, the lower-order bits 104-0 and 104-1 of the index part correspond to bank positions.

The address array is divided into four address arrays 110-0, 110-1, 110-2 and 110-3.

The data array is also divided into four data arrays 170-0, 170-1, 170-2 and 170-3.

Since the index parts 102-0 and 102-1 will represent entries registered in a cache memory, the address array and the data array of the operand cache memory according to the present invention are each divided into banks for each entry.

Although the present embodiment will be described with respect to an operand cache memory which stores a value to be operated, a variable and the like, it can be clearly understood that the present embodiment can be similarly realized by other kind of cache memory than an operand cache memory.

Data width of the data arrays 170-0, 170-1, 170-2 and 170-3 obtained by bank division is set to be the same as a data width of a cache block size as a data width of one cache entry. This is a value equivalent to a target data width multiplied by the number of block part addresses.

As one example of a numeric value, in a case where the data width of the data arrays 170-0, 170-1, 170-2 and 170-3 is 64 bytes and the target data width is 8 bits, the number of block part addresses will be eight.

In FIG. 1, the address arrays 110-0, 110-1, 110-2 and 110-3 and the data arrays 170-0, 170-1, 170-2 and 170-3 are illustrated in duplexed (two displayed overlapping), which shows that the address arrays and the data arrays are formed of two sets premised on a two-way set-associative operand cache.

Although the arrays are illustrated in duplex, each set is different and the contents of its data also differ from each other.

The selectors 160-0, 160-1, 160-2 and 160-3 are capable of selecting from which of access addresses, 100-0 or 100-1, an access should be made for their respective address arrays 110-0, 110-1, 110-2 and 110-3 and data arrays 170-0, 1,70-1, 170-2 and 170-3.

More specifically, in the selectors 160-0, 160-1, 160-2 and 160-3, either one of the tag part 101-0 and the tag part 101-1 is selected and supplied to each of the address arrays 116-0, 110-1, 110-2 and 110-3 and the data arrays 170-0, 170-1, 170-2 and 170-3 which are divided into banks and the tag address comparators 120-0, 120-1, 120-2 and 120-3.

Similarly, in the selectors 160-0, 160-1, 160-2 and 160-3, either the index part 102-0 or the index part 102-1 is selected and supplied to each of the address arrays 110-0, 110-1, 110-2 and 110-3 and the data arrays 170-0, 170-1, 170-2 and 170-3 which are divided into banks and the tag address comparators 120-0, 120-1, 120-2 and 120-3.

Index parts 162-0, 162-1, 162-2, and 162-3 selected by the selectors 160-0, 160-1, 160-2 and 160-3 become read addresses of the address arrays 110-0, 110-1, 110-2 and 110-3 and the data arrays 170-0, 170-1, 170-2 and 170-3, respectively.

Here, tag information 111-0, 111-1, 111-2 and 111-3 read from the address arrays 110-0, 110-1, 110-2 and 110-3 are compared at the tag address comparators 120-0, 120-1, 120-2 and 120-3 with tag parts 161-0, 161-1, 161-2 and 161-3 selected by the selectors 160-0, 160-1, 160-2 and 160-3, respectively, to generate cache hit determination signals 121-0, 121-1, 121-2 and 121-3 indicating whether data of a relevant tag address is registered in the operand cache memory.

The tag part 101-0 and the tag part 101-1 of the two different access addresses 100-0 and 100-1 are applied to the comparator 140-0 which compares tag part bit values of the two lines.

The index part 102-0 and the index part 102-1 of the two different access addresses 100-0 and 100-1 are applied to the comparator 140-1 which compares two-line index part bit values.

The index part lower-order bit 104-0 and the index part lower-order bit 104-1 of the two different access addresses 100-0 and 100-1 are applied to the comparator 140-2 which compares index part lower-order bit values of the two lines.

The comparators 140-0, 140-1 and 140-2 are capable of generating a tag part coincidence determination signal 141-0, an index part coincidence determination signal 141-1 and a bank part coincidence determination signal 141-2, respectively, which correspond to the tag parts 101-0 and 101-1, the index parts 102-0 and 102-1 and the index part lower-order bits 104-0 and 104-1.

Although the bank coincidence determination signal 141-2 is for determining coincidence of an index part lower-order bit, because the index part lower-order bits 104-0 and 104-1 correspond to divided banks, it will be described as the bank coincidence determination signal 141-2.

These three determination signals are applied to the selection control signal generation circuit 150.

The selection control signal generation circuit 150 is capable of generating address information selection control signals 151-0, 151-1, 151-2 and 151-3 to be applied to the selectors 160-0, 160-1, 160-2 and 160-3 based on these three determination signals.

With the above-described structure, cache block data 171-0, 171-1, 171-2 and 171-3 corresponding to any one of the two different access addresses 100-0 and 100-1 is output from the data arrays 170-0, 170-1, 170-2 and 170-3 of the respective banks.

The cache block data 171-0, 171-1, 171-2 and 171-3 is applied to the two bank selection circuits 180-0 and 180-1 corresponding to the two different access addresses 100-0 and 100-1, respectively.

The bank selection circuits 180-0 and 180-1 are allowed to select only cache block data of a data array in one bank according to the index part lower-order bits 104-0 and 104-1.

By the above-described processing, cache block data is output from the bank selection circuits 180-0 and 180-1 corresponding to the access addresses 100-0 and 100-1.

The selection circuits 190-0 and 190-1 are capable of selecting the necessary target data 191-0 and 191-1 by identifying the block parts 103-0 and 103-1 of the output cache block data.

The selection circuits 190-0 and 190-1 select the necessary target data 191-0 and 191-1 by identifying the block parts 103-0 and 103-1 of the cache block data to output the two target data 191-0 and 191-1 represented by the two different access addresses 100-0 and 100-1.

In an actual operand cache memory, such processing is required as processing of store data in a store instruction and data array rewriting processing following update of operand cache memory registration data and also required is peripheral logic other than those shown in FIG. 1 for these processing. Among them are effective bit information indicating whether data registered in an operand cache is effective or ineffective and the following processing of invalidating target data read from the operand cache memory.

The structure shown in FIG. 1 corresponds to a structure of a two-way set-associative system operand cache memory.

In a set-associative system operand cache memory, there will exist the same number of cache hit determination signals 121-0, 121-1, 121-2 and 121-3 as the number of sets. Also required is processing of, after selecting these signals by the bank selection circuits 180-0 and 180-1, selecting cache block data output from the plurality of sets in response to a cache hit determination signal.

The above-described processing is not a subject of the present invention and is therefore not shown in order to avoid complication of the drawings.

In addition, although with respect to the structure shown in FIG. 1, described is the embodiment of executing two reading processings simultaneously with access addresses as two lines, it can be clearly understood that the access addresses are not limited to two lines but be a plurality of lines not less than three lines.

The number of sets in a set-associative structure of an operand cache memory is also the case and it is apparent that the present invention is applicable not only to the case of two sets illustrated in FIG. 1 but also to a set-associative system having a plurality of sets not less than three sets.

Next, detailed description will be made of access control operation of the multiport cache memory according to the present embodiment with reference to the drawings.

Using the structure of the present embodiment shown in FIG. 1, operation will be described. In the following, the description will be made with reference to a main part of FIG. 1 as required.

In the following, operation will be particularly described with respect to a method by the selection control signal generation circuit 150 of generating the address information selection control signals 151-0, 151-1, 151-2 and 151-3 that determine which address information should be selected in the two different access addresses 100-0 and 100-1, which is most characteristic operation of the present invention.

Applied to the selection control signal generation circuit 150 are three signals, the tag part coincidence determination signal 141-0 obtained by comparing the tag part 101-0 and the tag part 101-1 at the comparator 140-0, the index part coincidence determination signal 141-1 obtained by comparing the index part 102-0 and the index part 102-1 at the comparator 140-1 and the bank coincidence determination signal 141-2 obtained by comparing the index part lower-order bit 104-0 and the index part lower-order bit 104-1 at the comparator 140-2. Here, the index part lower-order bit is a bit representing a bank structure.

In the following, simultaneous reading processing will be described with respect to four cases, A, B, C and D which are classified according to the degree of coincidence of the above-described three signals.

Considerer a case as the case A where the tag part coincidence determination signal 141-0 which determines coincidence of a tag part indicates coincidence and the index part coincidence determination signal 141-1 which determines coincidence of an index part also indicates coincidence.

In this case, both of the access addresses of the two lines are considered to access target data in the same cache block. However, since the block part fails to coincide, their target data differ from each other and the determination can be made by the block parts 103-0 and 103-1 of the two-line access addresses 100-0 and 100-1.

In such a case, it is only necessary to make only either one of the two-line access addresses 100-0 and 100-1 be effective to read cache block data from only an address array and a data array indicated by the relevant index part lower-order bit.

Give priority to the two-line access addresses in advance to use, in the case A where only either one is required for the processing of reading from the address array and the data array, a tag part and an index part of the access address having the higher priority. For the convenience of description, set the access address 100-0 to have higher priority.

In the following, description will be made of a flow of the processing.

Figure 2:
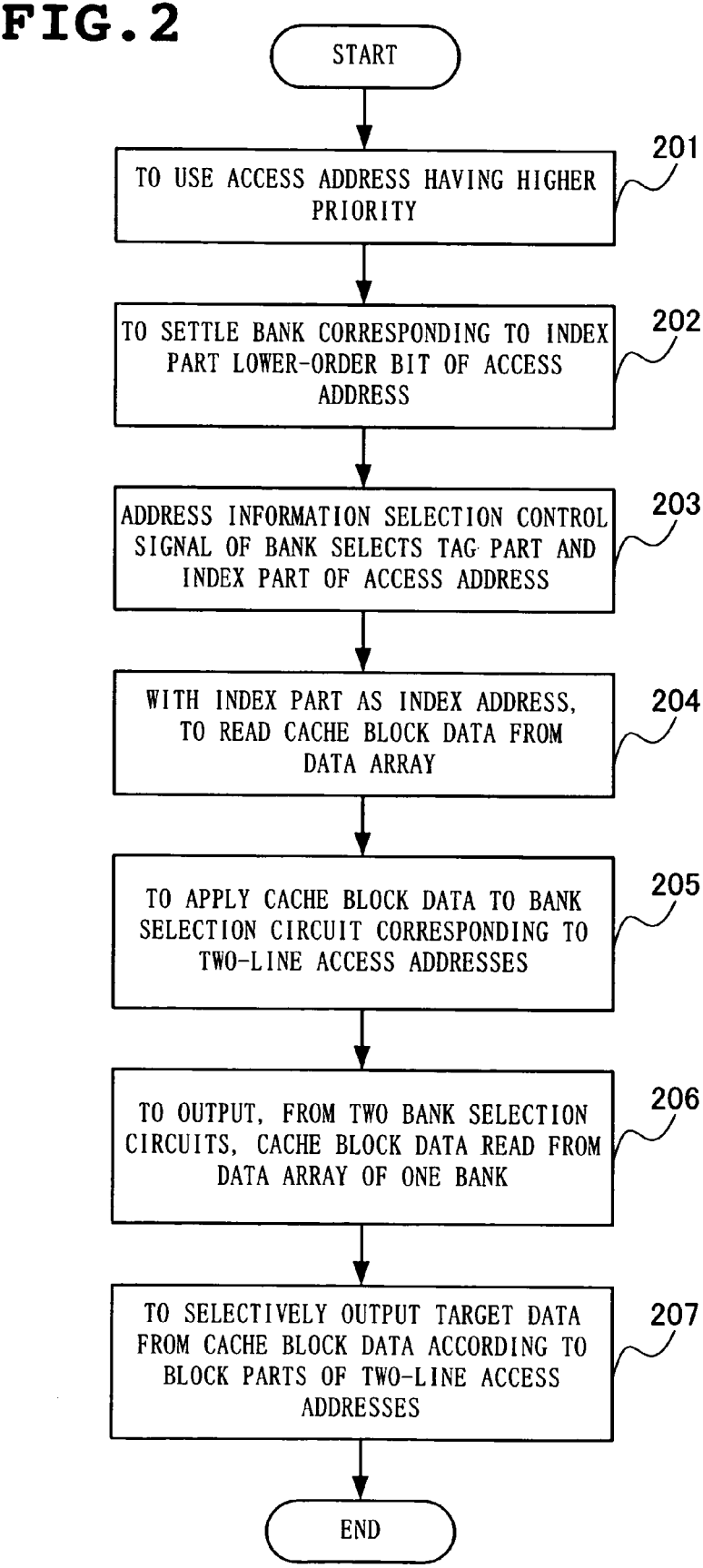
FIG. 2 is a flow chart for use in explaining a flow of simultaneous reading processing in a case A according to the first embodiment of the present invention.

FIG. 2 is a flow chart for use in explaining a flow of simultaneous reading processing of the case A according to the present embodiment. In the following, the description will be made of a main part of FIG. 1 as required.

With reference to FIG. 2, first, make only an access address having higher priority be effective (Step 201).

Next, when a bank to be accessed according to the index part lower-order bit 104-0 of the access address 100-0 is settled (Step 202), set the address information selection control signals 151-0, 151-1, 151-2 and 151-3 of the bank to select the tag part 101-0 and the index part 102-0 of the access address 100-0 (Step 203).

With the index part 102-0 as an index address, cache block data read from the data array (Step 204) is applied to the bank selection circuits 180-0 and 180-1 corresponding to the access address 100-0 and the access address 100-1, respectively (Step 205).

Since the selection control signals of the bank selection circuits 180-0 and 180-1 are the index part lower-order bits 104-0 and 104-1 and their values are coincident with each other, cache block data read from the data array in the same bank will be output from the two bank selection circuits 180-0 and 180-1 (Step 206).

Thereafter, selectively outputting the target data 191-0 and 191-1 from the relevant cache block data according to the block parts 103-0 and 103-1 of the respective access addresses 100-0 and 100-1 leads to simultaneous read of the target data 191-0 and 191-1 corresponding to the two-line access addresses 100-0 and 100-1 (Step 207).

Figure 3:
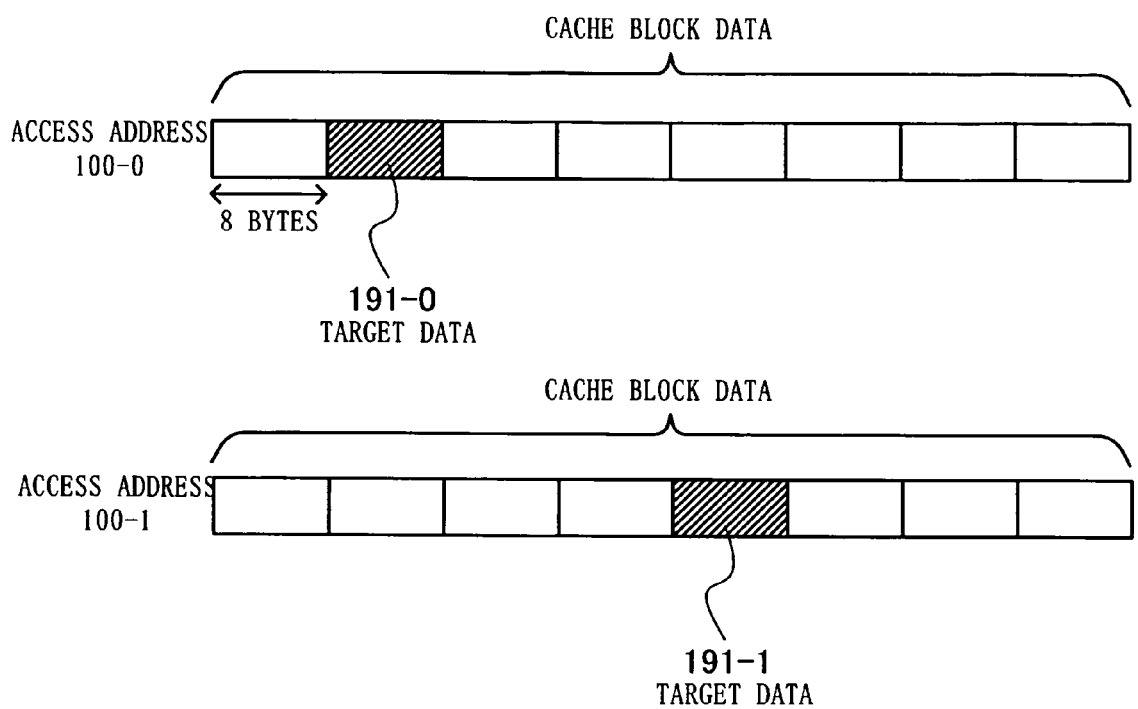
FIG. 3 is a diagram for use in explaining one example of reading target data from cache block data in the case A according to the first embodiment of the present invention.

FIG. 3 is a diagram for use in explaining one example of read of target data from cache block data in the case A according to the present embodiment. In the following, the description will be made with reference to a main part of FIG. 1 as required.

With reference to FIG. 3, illustrated are two cache block data which are read from the two bank selection circuits 180-0 and 180-1 and correspond to the access addresses 100-0 and 100-1. The contents of the two cache block data are the same.

The cache block data width is 64 bytes and the target data width is 8 bytes. In this example, the block part address width is 3 bits to store 8 data.

When the cache block data passes through the selection circuits 190-0 and 190-1 which select target data, the two target data 191-0 and 191-1 designated by the two access addresses 100-0 and 100-1 are output.

The two target data 191-0 and 191-1 can be read by reading the data of the block part 103-0 and the block part 103-1 as illustrated in FIG. 3.

While it is a common practice to set the address information selection control signals in the remaining three banks not selected by the index part lower-order bit 104-0 of the access address 100-0 at this time to select the access address 100-0 having higher priority as a default state, with a more improved structure, it is possible to stop clock supply of such a bank whose access fails to occur or set the address array and the data array at a power-save mode.

Consider a case, as the case B, where the tag part coincidence determination signal 141-0 indicates lack of coincidence and the index part coincidence determination signal 141-1 indicates coincidence. In this case, the index part lower-order bit 104-0 of the access address 100-0 and the index part lower-order bit 104-1 of the access address 100-1 will coincide with each other similarly to the case A, so that the same bank will be accessed.

However, unlike the case A, the tag part 141-0 and the tag part 141-1 fail to coincide with each other, which represents that cache block data as a target is stored in a different set in the set-associative system cache memory.

In the following, description will be made of a flow of the processing.

Figure 4:
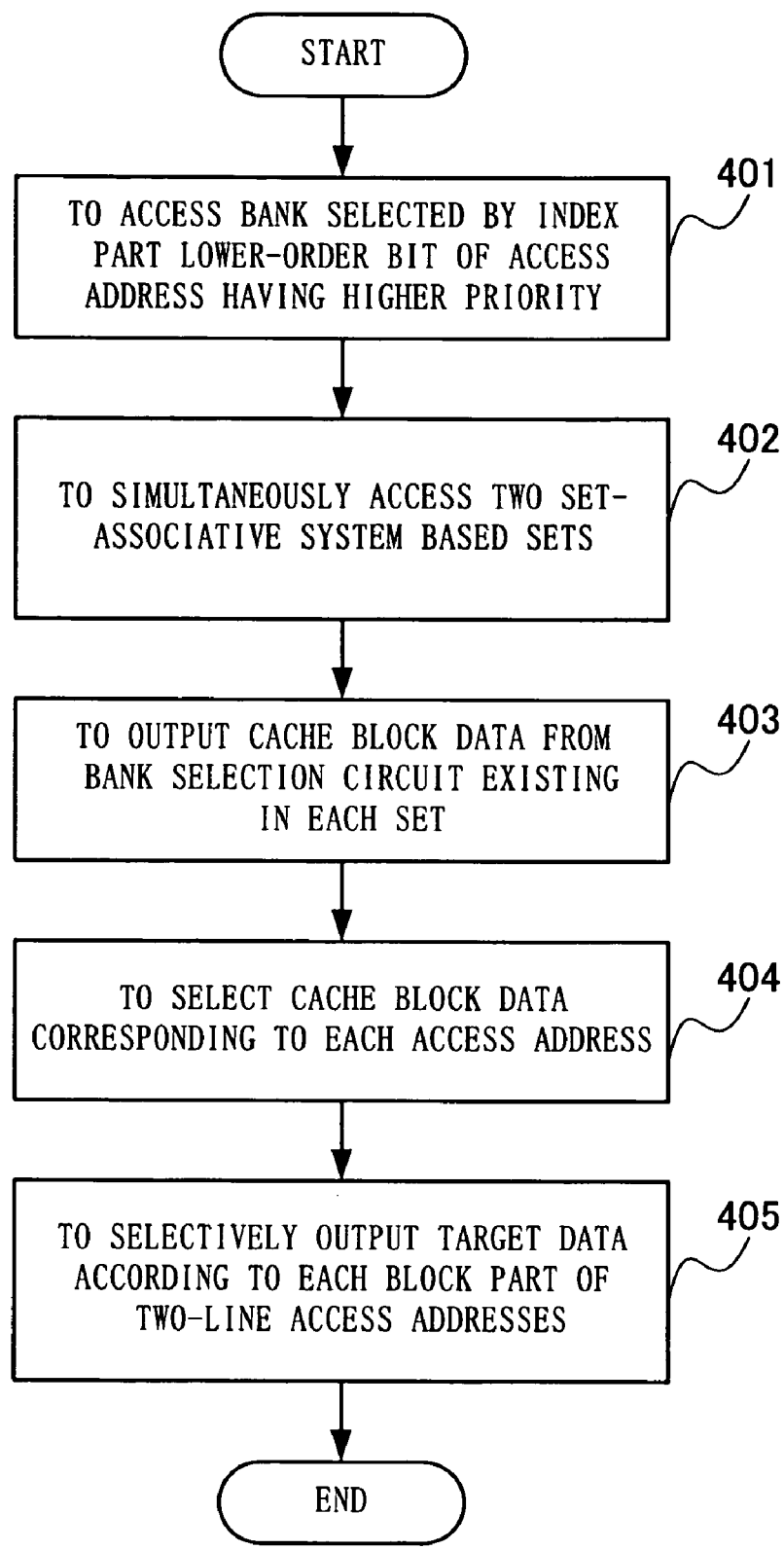
FIG. 4 is a flow chart for use in explaining a flow of simultaneous reading processing in a case B according to the first embodiment of the present invention.

FIG. 4 is a flow chart for use in explaining a flow of simultaneous reading processing of the case B according to the present embodiment. In the following, the description will be made of a main part of FIG. 1 as required.

With reference to FIG. 4, in the case B, access only a bank selected by the index part lower-order bit 104-0 as a bank constituent bit of the access address 100-0 having the higher priority similarly to the case A (Step 401).

However, at this time, simultaneously accessing two sets of the set-associative system (Step 402) to output cache block data from the bank selection circuits 180-0 and 180-1 existing in each set (Step 403).

Although the bank selection circuits 180-0 and 180-1 are each formed of two sets, their illustration is omitted for preventing complication of the drawing. Description will be made of a part not shown.

Assume a case of reading cache block data from two set-associative system sets in a bank 0 (Bank #0), comparison will be made by the tag address comparator 120-0 between tag parts of the two sets registered in the address array 110-0 and the tag parts 101-0 and 101-1. The tag parts registered at the address array 110-0 vary with a cache set because they are of the set-associative system and there are two sets. In addition, there are two tag address comparators 120-0 (although not shown in the figure, they are duplexed).

Therefore, the two sets of the tag parts registered at the address array 110-0 and the tag parts 101-0 and 101-1 will be compared at the above-described two tag address comparators 120-0, respectively.

Next, follow the cache hit determination signal 121-0 coinciding with the tag part 101-0 or 101-1 of each of the access addresses 100-0 and 100-1. Although the cache hit signal 121-0 is illustrated only one in the figure, there are two in practice.

The foregoing is all for the description of the part not shown.

By the foregoing processing, select, from cache block data of a plurality of sets, each cache block data corresponding to the respective access addresses 100-0 and 100-1 (Step 404).

Thereafter, selectively outputting target data according to the block parts 103-0 and 103-1 of the respective access address 100-0 and access address 100-1 leads to simultaneous read of target data required by the two-line access addresses 100-0 and 100-1 in the case B (Step 405).

While it is a common practice to set the address information selection control signals in the remaining three banks not selected by the index part lower-order bit 104-0 of the access address 100-0 at this time to select the access address 100-0 side having higher priority as a default state, with a more improved structure, it is possible to stop clock supply of such a bank whose access fails to occur or set the address array and the data array at a power-save mode.

The case C and the case D set forth below are premised on that a tag part of any of the addresses fails to coincide.

Considerer a case as the case C where the index part coincidence determination signal 141-1 indicates lack of coincidence and the bank coincidence determination signal 141-2 also indicates lack of coincidence. In this case, since the access address 100-0 and the access address 100-1 have no bank contention, it is indicated that the addresses access different banks.

In this case, settle a bank to be accessed according to the index part lower-order bit 104-0 of the access address 100-0 and set an address information selection control signal of the bank to select the tag part 101-0 and the index part 102-0 of the access address 100-0.

On the other hand, also with respect to the index part lower-order bit 104-1 of the access address 100-1, settle a bank to be accessed and set an address information selection control signal of the bank to select the tag part 101-1 and the index part 102-1 of the access address 100-1.

With the respective index parts 102-0 and 102-1 as index addresses, cache block data read from the data arrays are applied to the bank selection circuits 180-0 and 180-1 corresponding to the access address 100-0 and the access address 100-1.

Since the selection control signals of the bank selection circuits 180-0 and 180-1 are the index part lower-order bits 104-0 and 104-1, respectively, cache block data will be read from two banks.

More specifically, two cache block data read from a bank set to select the tag part 101-0 and the index part 102-0 of the access address 100-0 by the address information selection control signal and a bank set to select the tag part 101-1 and the index part 102-1 of the access address 100-1 by the address information selection control signal will be output from the bank selection circuits 180-0 and 180-1.

Thereafter, selectively outputting the target data 191-0 and 191-1 from the respective cache block data according to the block parts 103-0 and 103-1 of the respective access address 100-0 and access address 100-1 leads to simultaneous read of the target data 191-0 and 191-1 required by the two-line access addresses in the Case C.

While it is a common practice to set the address information selection control signals in the remaining two banks not selected by the index part lower-order bit 104-0 of the access address 100-0 and the index part lower-order bit 104-1 of the access address 100-1 at this time to select the access address 100-0 having higher priority as a default state, with a more improved structure, it is possible to stop clock supply of such a bank whose access fails to occur or set the address array and the data array at a power-save mode.

Consider a case as the case D where the index part coincidence determination signal 141-1 indicates lack of coincidence and the bank coincidence determination signal 141-2 indicates coincidence. In this case, since an address which the access address 100-0 accesses and an address which the access address 100-1 accesses will have bank contention, it is indicated that either one of the addresses can be accessed. In this case, in general, execute processing of invalidating an access from the access address 100-1, giving preference to an access from the access address 100-0 having higher priority.

As described in the foregoing, while an operand cache memory having a conventional bank structure enables two addresses to be simultaneously accessed only in the case C, the operand cache memory having the bank structure according to the present invention enables two accesses simultaneously also in the case A and the case B. More specifically, a plurality of reading processings can be executed simultaneously in the following three cases.

Case A: When tag parts and index parts in access addresses of the respective lines coincide with each other, since the data is in the same cache block, distribute cache block data read from a data array in the relevant bank to a reading port to selectively output necessary target data according to a block part of each access address.

Case B: When tag parts in access addresses of the respective lines fail to coincide with each other and index parts coincide, since the data is in a different cache set in the same bank, read a plurality of cache block data from a plurality of cache sets of a data array in the relevant bank and transfer the read data to two reading ports corresponding to access addresses coinciding with tag parts registered in the respective cache sets to selectively output necessary target data according to a block part of each access address.

Case C: When neither tag parts nor index parts in access addresses of the respective lines coincide with each other and not a lower-order bit of an index part which defines bank division either, since the data is in a different bank, make an access independently for each bank according to an access address of each line to read cache block data from a data array and selectively output necessary target data according to a block part of each access address.

In addition, as compared with a multiport cache memory having a conventional bank structure, since the present invention only requires bank division of a data array, an increase in an area is little and there is a possibility of area reduction because of changing an address array from duplexing to bank division. However, because a shortcoming is also involved that an area is increased due to a division loss caused by bank division, the cache memory can be realized with substantially equal area to that of a conventional memory in total.

As described in the foregoing, the multiport cache memory according to the present embodiment is characterized in that the cache block data 171-0, 171-1, 171-2 and 171-3 registered in the address arrays 110-0, 110-1, 110-2 and 110-3 and the data arrays 170-0, 170-1, 171-2 and 170-3 as components of the cache memory are indexed by the plurality of access addresses 100-0 and 100-1, reading processing of a plurality of target data corresponding to the plurality of access addresses 100-0 and 100-1 is executed simultaneously and the address arrays 110-0, 110-1, 110-2 and 110-3 and the data arrays 170-0, 170-1, 171-2 and 170-3 are divided into a plurality of banks which can be unitarily identified by the index part lower-order bits 104-0 and 104-1 of the access addresses 100-0 and 100-1.

Next, a structure of the data array as a characteristic component of the present invention will be described.

Figure 9:
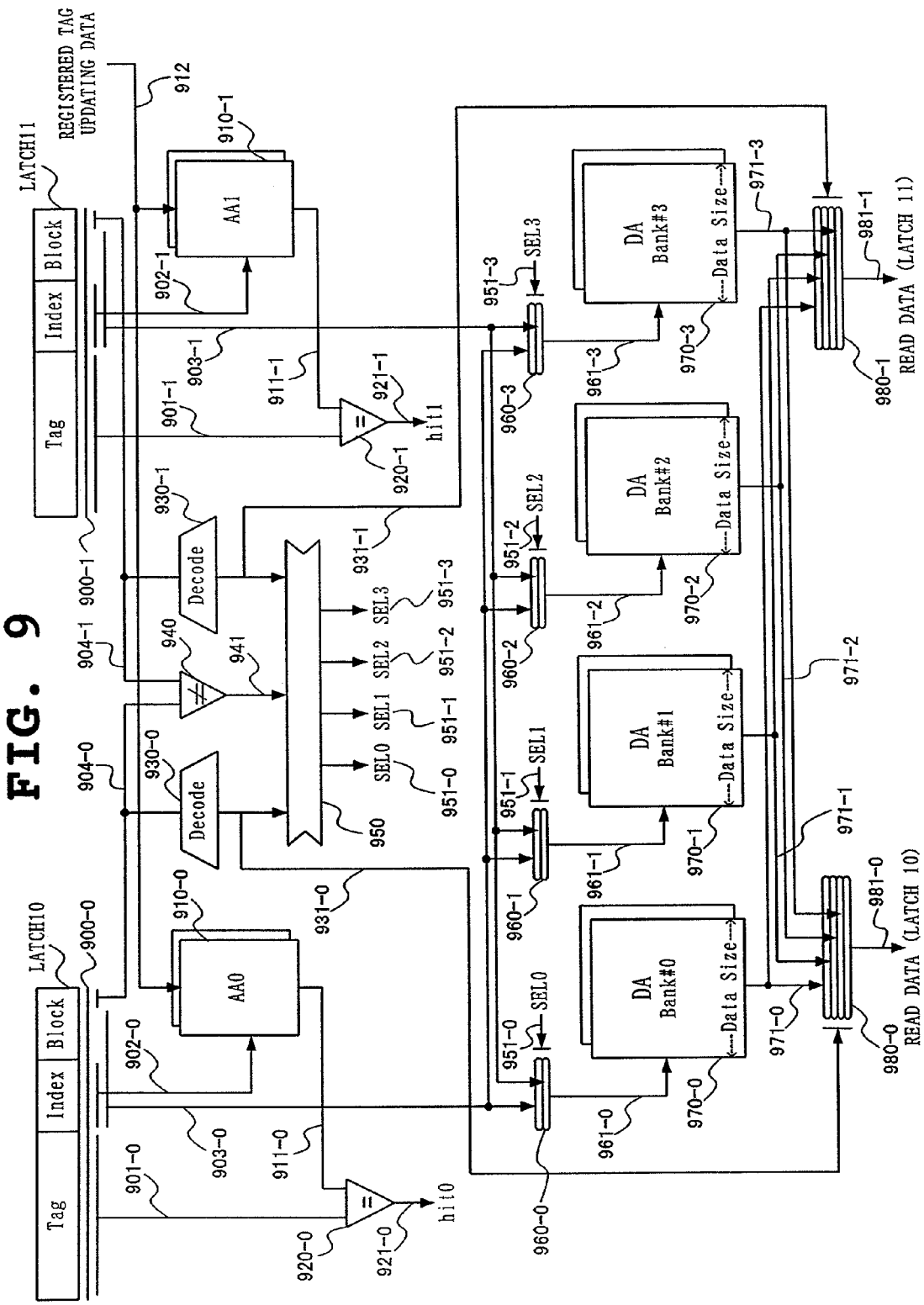
FIG. 9 is a block diagram showing a structure of a system 1 of a conventional multiport cache memory.
Figure 10:
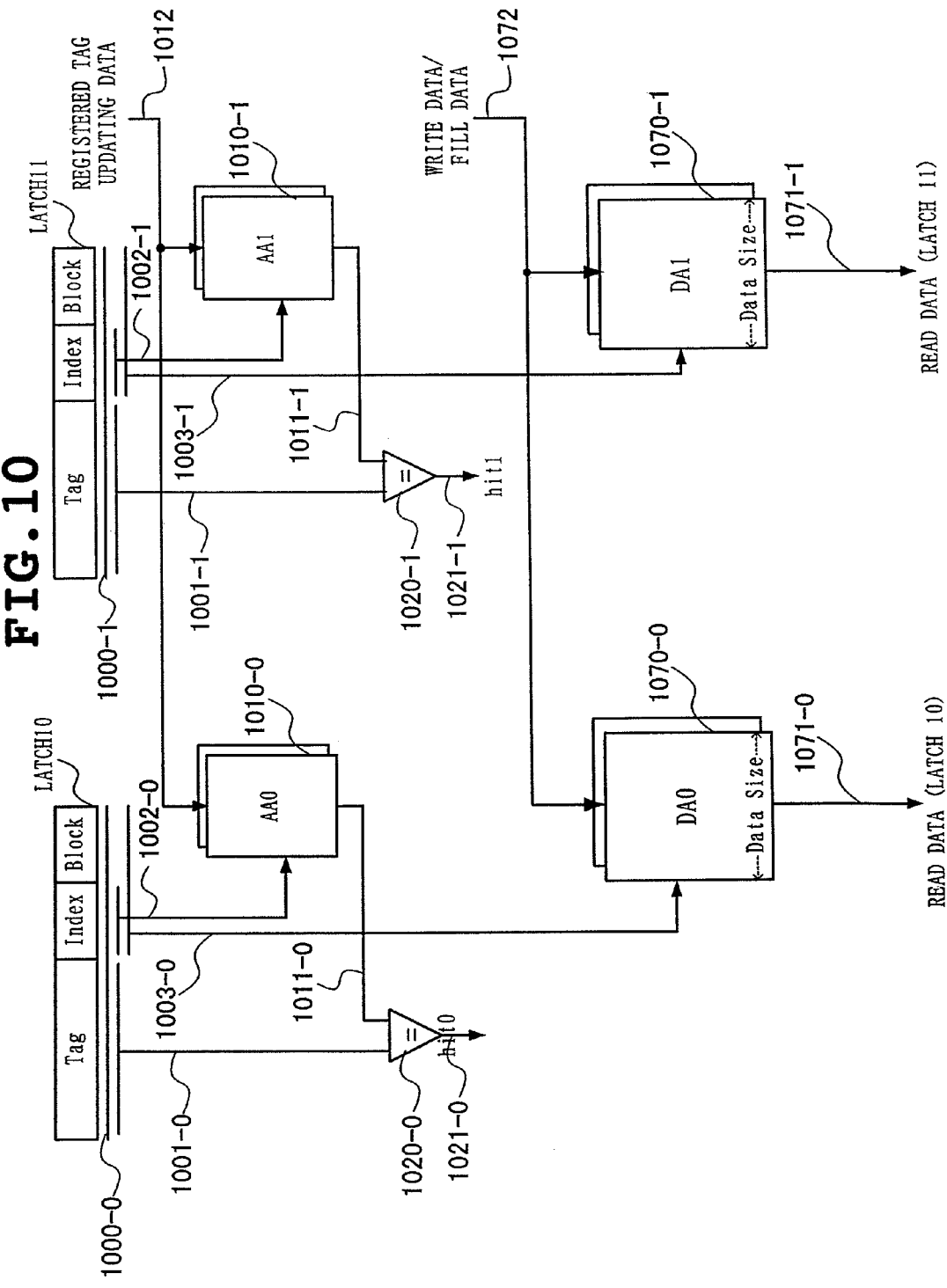
FIG. 10 is a block diagram showing a structure of a system 2 of a conventional multiport cache memory.
Figure 11:
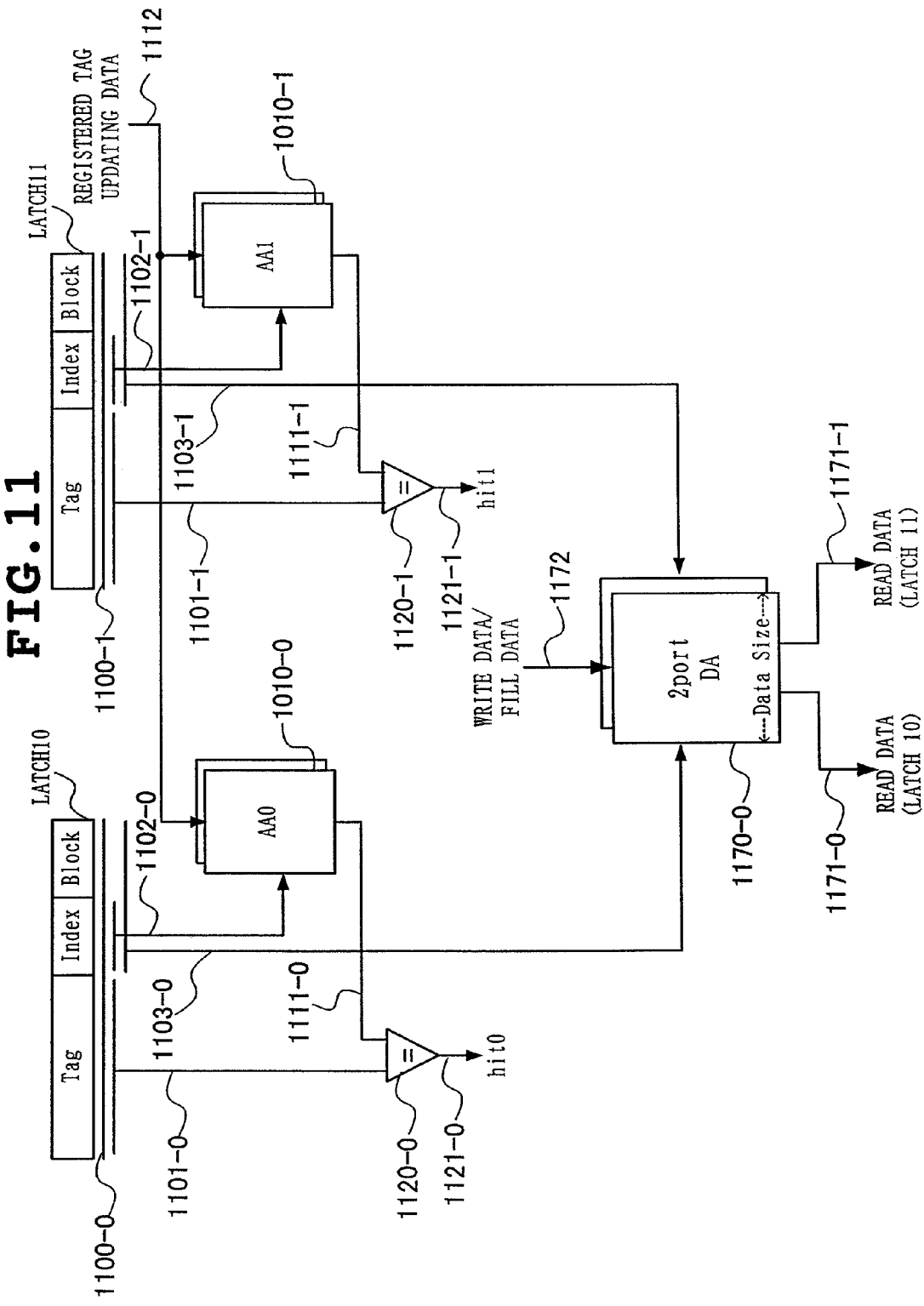
FIG. 11 is a block diagram showing a structure of a system 3 of a conventional multiport cache memory.

In such operand cache memories according to conventional art as described in "Description of the Related Art" and shown in FIG. 9 to FIG. 11, a data width of the data array is the same as a target data width. The target data width is a most typical access data width in its processor and in a case of 64-bit processor, for example, a target data width is 64 bits, that is, 8 bytes in general.

In the example according to the present embodiment shown in FIG. 3, the data width of the data array is as large as 64 bytes, which includes the number of target data distinguishable by the number of bits of the block part.

Figure 5:
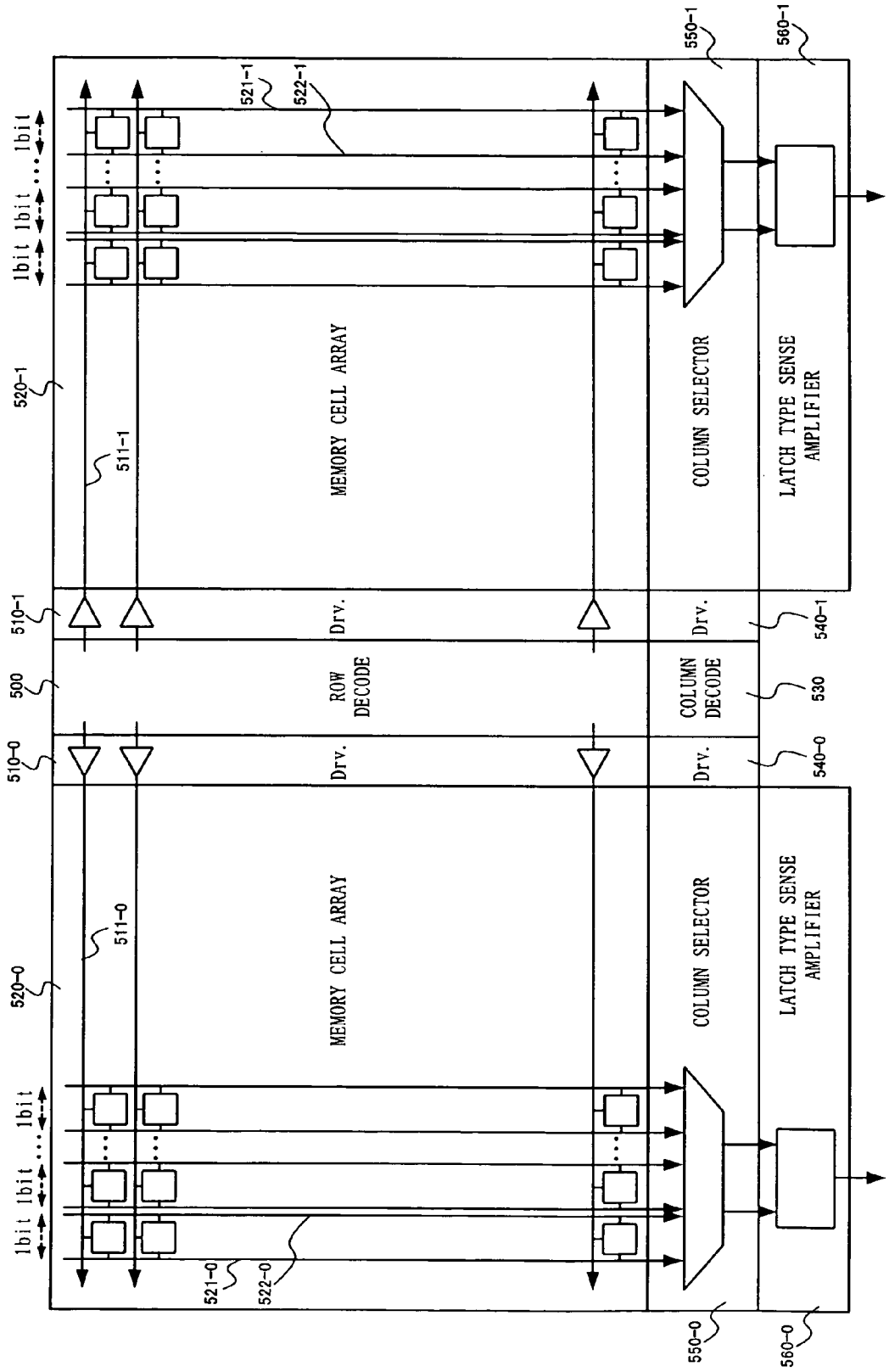
FIG. 5 is a diagram showing one example of an internal structure of an SRAM used in a data array in a conventional operand cache memory according to the first embodiment of the present invention.

FIG. 5 is a diagram showing one example of an internal structure of an SRAM (Static Random Access Memory) used in a data array in a conventional operand cache memory.

Data array has a relatively large capacity and in a typical case, in a two-way set-associative system operand cache memory having a 64 K-bytes capacity, one data array will have a capacity of 32 K-bytes.

Thus, in a data array of an operand cache memory required to make a rapid access in spite of its relatively large capacity, it is a common practice as shown in FIG. 5 to arrange a row decoder 500 which decodes a higher-order bit (MSB (Most Significant Bit)) of an address and a column decoder 530 which decodes a lower-order bit at the center and dispose word line drivers 510-0 and 510-1 and column line drivers 540-0 and 540-1 which amplify and drive a decoded signal at the opposite sides of the decoders.

At further opposite sides of the word line drivers 510-0 and 510-1, there exist memory cell arrays 520-0 and 520-1 having RAM cells as storage elements arranged two-dimensionally.

Figure 12:
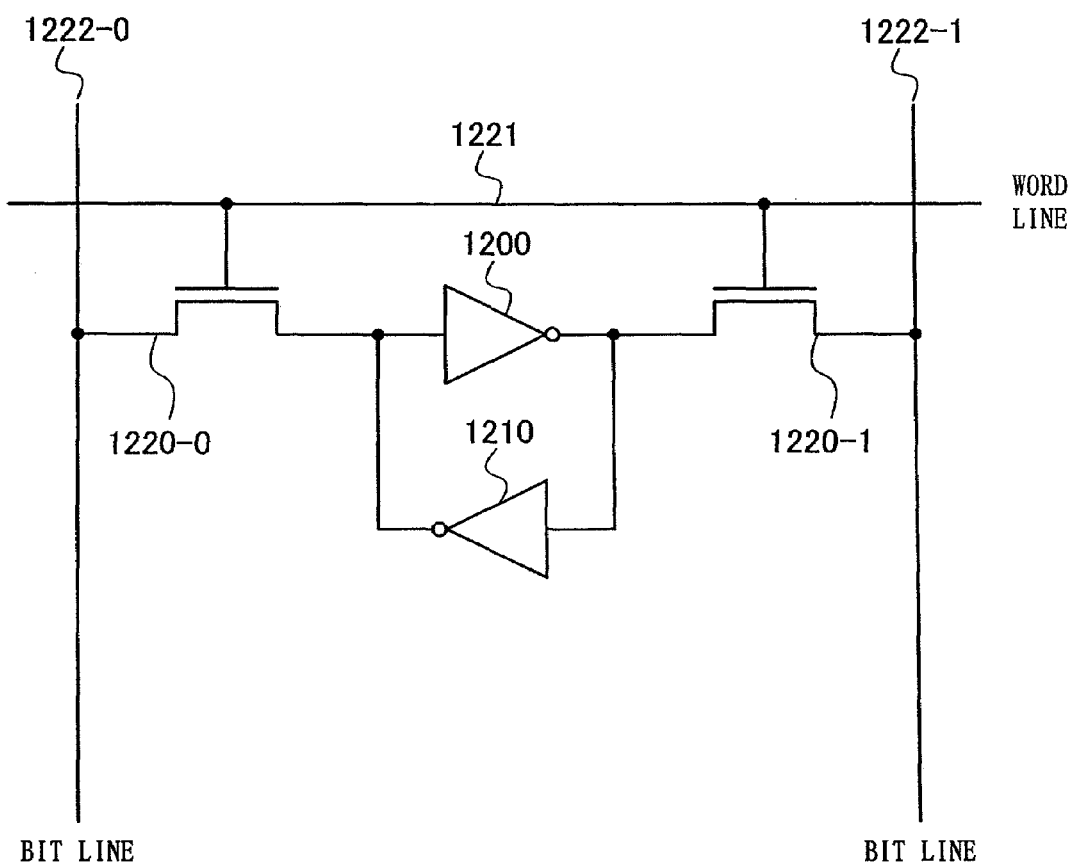
FIG. 12 is a diagram showing a structure of a conventional RAM cell.
Figure 13:
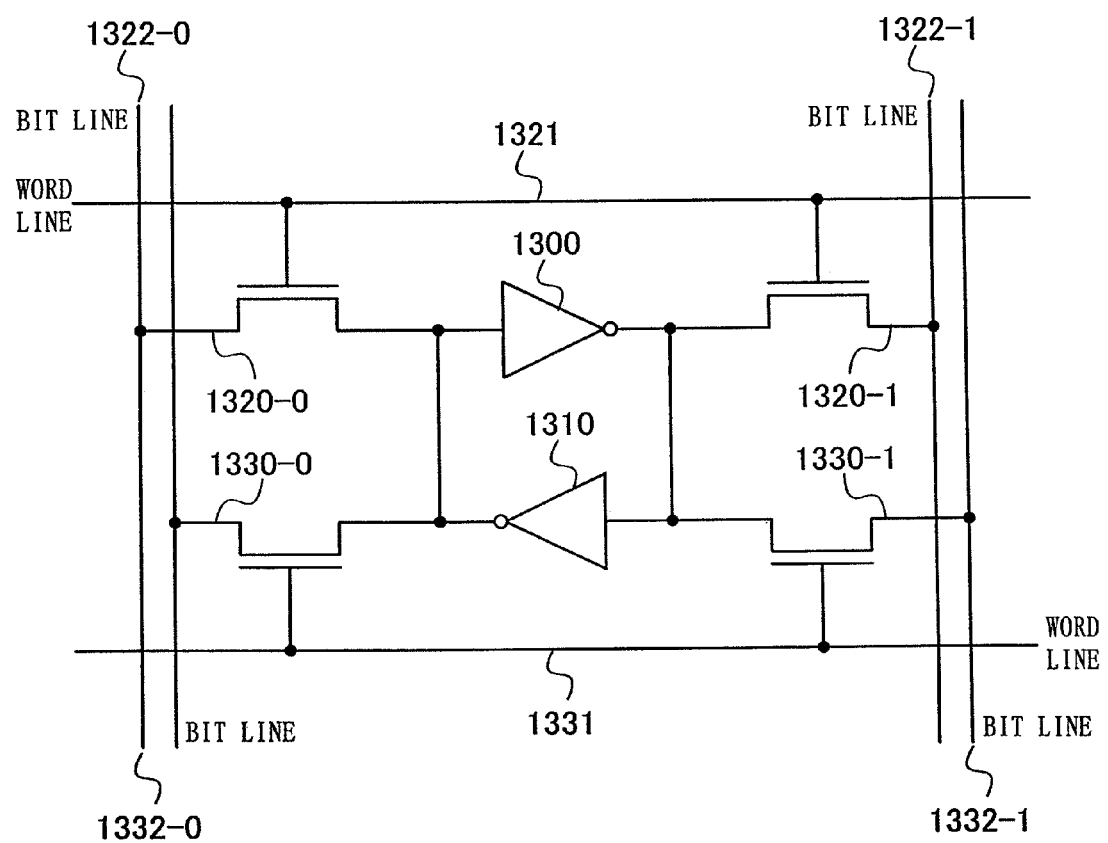
FIG. 13 is a diagram showing a structure of a conventional two-port RAM cell.

Structure of each one memory cell is the same as that shown in FIG. 12 as the Related Art and word lines 511-0 and 511-1 are connected to two bit lines 521-0 and 522-0, and 521-1 and 522-1, respectively, whose logic is inversion to each other. As data of one bit for a data width of the data array, column selectors 550-0 and 550-1 with a decoding result of the column decoder 530 as a selection control signal selects one from data read from a plurality of adjacent memory cells.

Unlike a signal propagating through an ordinary logic circuit, since a signal propagating on a bit line is a signal whose voltage amplitude is as low as a limit at which a noise margin can be ensured, data selected by the column selectors 550-0 and 550-1 is subjected to signal amplitude amplification by latch type sense amplifiers 560-0 and 560-1, while being latched to satisfy timing rules to maintain a signal waveform.

It can be found from the foregoing description that an access time of the data array is determined by a total delay time for passing on a path through the row decoder, the word line driver, the bit line driver, the column selector and the latch type sense amplifier.

In a case of a data array in an operand cache memory which has a relatively large capacity, a signal wiring length of a bit line which serves for signal transmission at a low voltage amplitude is increased to make speed-up of an access time difficult.

Under these circumstances, more and more of such SRAMs having a relatively large capacity and requiring high-speed access as a data array of an operand cache memory recently adopt an internal structure as set forth below.

Figure 6:
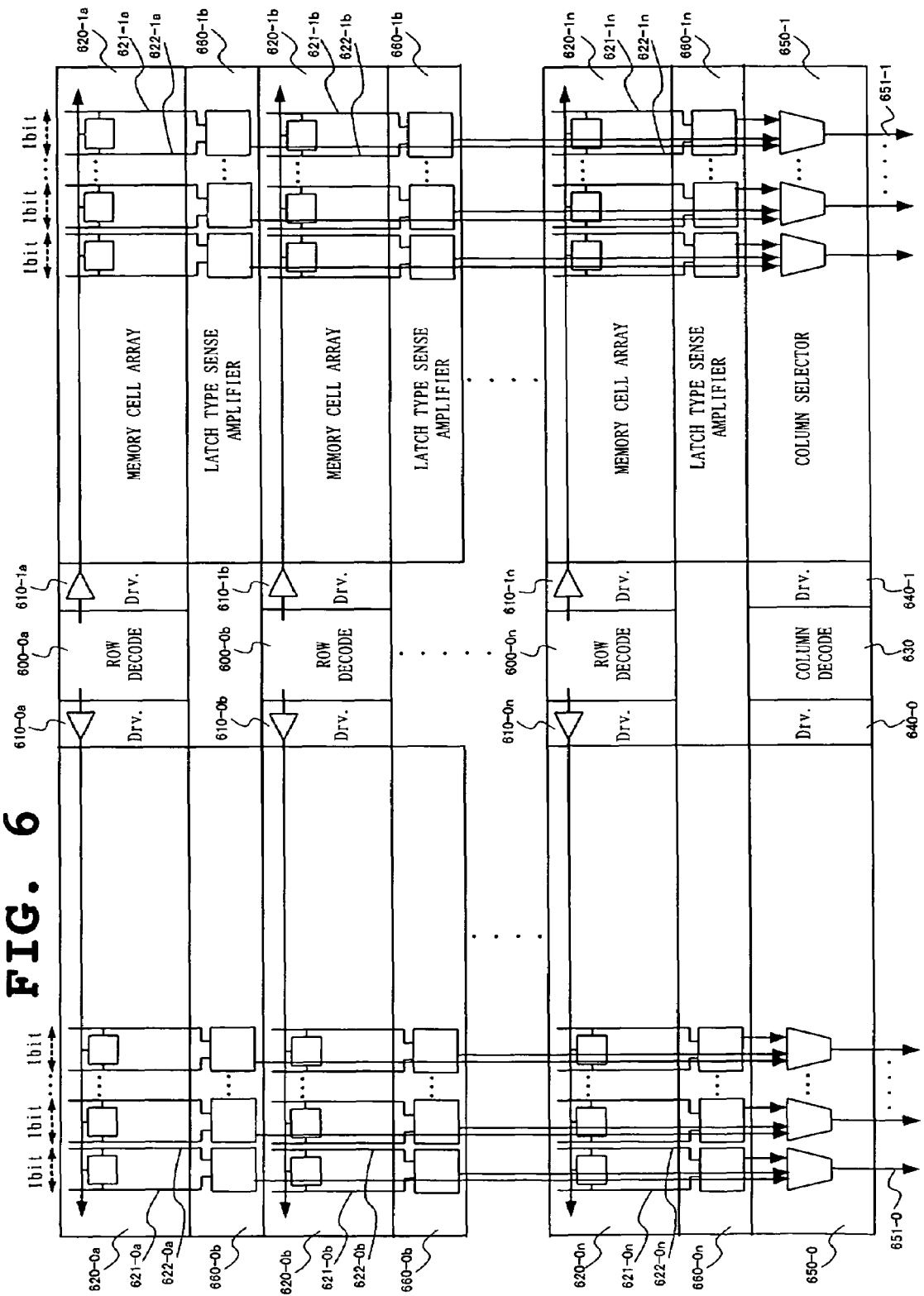
FIG. 6 is a diagram showing an internal structure of the SRAM for use in explaining the first embodiment of the present invention.

FIG. 6 is a diagram showing an internal structure of an SRAM for use in explaining the present embodiment.

With reference to FIG. 6, the SRAM includes column selectors 650-0 and 650-1 arranged after a signal passes through latch type sense amplifiers 660-0a, 660-1a, 660-0b, 660-1b, ..., 660-0n and 660-1n and includes as many SRAM banks as the number of columns arranged in parallel, which banks are formed of row decoders 600-a, 600-b, ..., 600-n, word line drivers 610-0a, 610-1a, 610-0b, 610-1b, ..., 610-0n and 610-1n, memory cell arrays 620-0a, 620-1a, 620-0b, 620-1b, ..., 620-0n, and the latch type sense amplifiers 660-0a, 660-1a, 660-0b, 660-1b, ..., 660-0n and 660-1n.

Signals with a low voltage amplitude which are read respectively from pairs of bit lines, 621-0a and 622-0a, 621-1a and 622-1b, 621-0b and 622-0b, 621-1b and 622-1b, ..., 621-0n and 622-0n, and 621-1n and 622-1n corresponding to the memory cell arrays 620-0a, 620-1a, 620-0b, 620-1b, ..., 620-0n and 620-1n have their signal amplitude amplified by the latch type sense amplifiers 660-0a, 660-1a, 660-0b, 660-1b, ..., 660-0n and 660-1n, respectively.

To the column selectors 650-0 and 650-1, signals whose signal amplitude has been amplified by the latch type sense amplifiers 660-0a, 660-1a, 660-0b, 660-1b, ..., 660-0n and 660-1n are applied and selected from the SRAM banks arranged in parallel according to a decoding result of a column decoder 630.

The foregoing arrangement enables a signal wiring length of a bit line which most affects an access time of the data array to be reduced and load capacity connected to the bit line to be reduced because the column selector conventionally connected to a bit line is not connected to the bit line, thereby realizing speed-up of an access time.

As illustrated in FIG. 6, the internal structure of the SRAM is changed. Such an SRAM which reads all the operand cache block data by one access as the data arrays 170-0, 170-1, 170-2 and 170-3 according to the present embodiment shown in FIG. 1 is realized in a manner as described in the following.

More specifically, as will be described in the following, such an SRAM can be realized by deleting the column decoder 630, column line drivers 640-0 and 640-1 and the column selectors 650-0 and 650-1 from the SRAM internal structure shown in FIG. 6 and using all the outputs from the latch type sense amplifiers 660-0a, 660-1a, 660-0b, 660-1b, 660-0n and 660-1n as data array read data.

Figure 7:
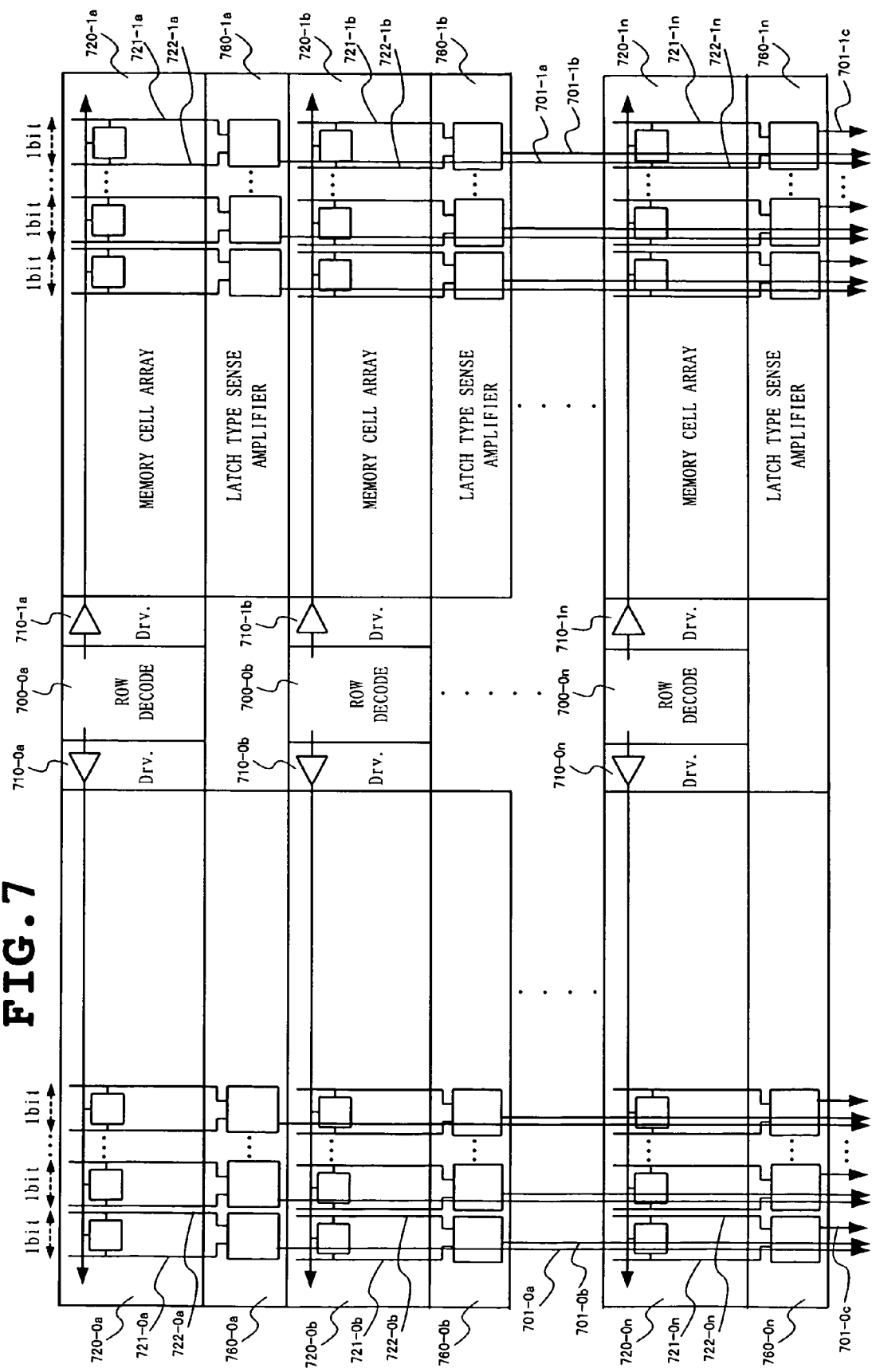
FIG. 7 is a diagram showing an internal structure of the SRAM according to the first embodiment of the present invention.

FIG. 7 is a diagram showing an internal structure of the SRAM according to the present embodiment.

With reference to FIG. 7, in the SRAM, signals pass through latch type sense amplifiers 760-0a, 760-1a, 760-0b, 760-1b, ..., 760-0n and 760-1n, and SRAM banks are arranged in parallel which include row decoders 700-a, 700-b, ..., 700-n, word line drivers 710-0a, 710-1a, 710-0b, 710-1b, ..., 710-0n and 710-1n, memory cell arrays 720-0a, 720-1a, 720-0b, 720-1b, ..., 720-0n, and the latch type sense amplifiers 760-0a, 760-1a, 760-0b, 760-1b, ..., 760-0n and 760-1n.

Outputs 701-0a, 701-1a, 701-0b, 701-1b, ..., 701-0n and 701-1n from the latch type sense amplifiers 760-0a, 760-1a, 760-0b, 760-1b, ..., 760-0n and 760-1n are all used as data array read data.

Thus, it is understood that the data array used in the present invention is well consistent with improvement of the SRAM internal structure currently implemented as an operand cache memory for speeding up an access time and is advantageous not only in improvement of effective performance by the reduction of bank contention but also in improvement of an operating frequency involved in speed-up of an access time of the operand cache memory.

According to the embodiment described above, a probability of occurrence of bank contention can be reduced which occurs when executing a plurality of reading processings simultaneously.

The reason is that when the tag parts 101-0 and 101-1 and the index parts 102-0 and 102-1 in the access addresses 100-0 and 100-1 of a plurality of lines whose reading processing should be executed simultaneously coincide with each other, since the data is in the same cache block, one cache block data read from a data array in the relevant bank is distributed to a plurality of reading ports to selectively output necessary target data according to the block part of each of the access addresses 100-0 and 100-1.

On the other hand, when the tag parts 101-0 and 101-1 indicate lack of coincidence and the index parts 102-0 and 102-1 coincide, since the data is in a different cache set in the same bank based on the set-associative system, a plurality of cache block data are read from a plurality of cache sets of the data array in the relevant bank and transferred to a plurality of reading ports corresponding to access addresses of the cache block data to selectively output necessary target data according to the block part of each of access addresses 100-0 and 100-1.

It is also possible to provide a multiport cache memory which involves no reduction of an operating frequency at the time of reducing a probability of occurrence of bank contention.

The reason is that the data arrays 170-0, 170-1, 170-2 and 170-3 used in the present invention are well consistent with improvement of an SRAM internal structure currently implemented as an operand cache memory for speeding up an access time.

Second Embodiment

Next, a second embodiment of the present invention will be described with reference to the drawings.

Figure 8:
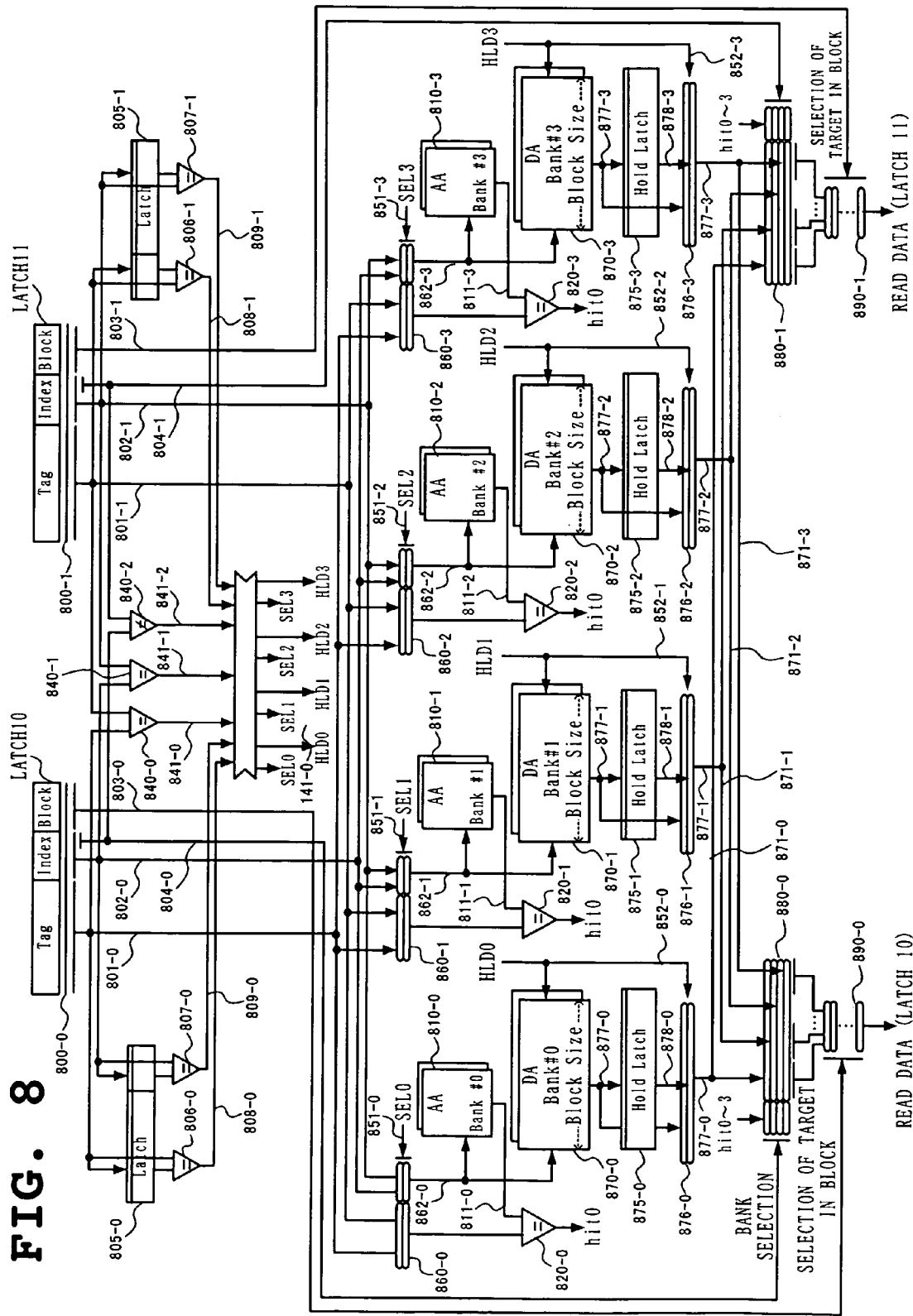
FIG. 8 is a block diagram showing a structure of a multiport cache memory according to a second embodiment of the present invention.

FIG. 8 is a block diagram showing a structure of a multiport cache memory according to the present embodiment.

Main difference from the structure of the embodiment shown in FIG. 1 is addition of latches 805-0 and 805-1 and hold latches 875-0, 875-1, 857-2 and 875-3.

Since functions of tag address comparators 820-0, 820-1, 820-2 and 820-3, selectors 860-0, 860-1, 860-2 and 860-3, selection circuits 890-0 and 890-1, and address arrays 810-0, 810-1, 810-2 and 810-3 are the same as those shown in FIG. 1, no description will be made hereof.

In the following, description will be made of the added parts.

First, added are the latches 805-0 and 805-1 which hold tag parts 801-0 and 801-1 and index parts 802-0 and 802-1 of access addresses 800-0 and 800-1 held by the latches 10 and 11 last time.

Further provided are comparators 806-0 and 806-1 which compare the tag parts 801-0 and 801-1 of the access addresses 800-0 and 800-1 as of last time and the tag parts 801-0 and 801-1 of the access addresses 800-0 and 800-1 as of this time, respectively, and comparators 807-0 and 807-1 which compare the index parts 802-0 and 802-1 of the access addresses 800-0 and 800-1 as of last time and the index parts 802-0 and 802-1 of the access addresses 800-0 and 800-1 as of this time, respectively.

Tag part coincidence determination signals 808-0 and 808-1 output from the comparators 806-0 and 806-1 and index part coincidence determination signals 809-0 and 809-1 output from the comparators 807-0 and 807-1 are applied to a selection control signal generation circuit 850.

Next, the addition of the hold latches 875-0, 875-1, 875-2 and 875-3 will be described.

Add the hold latches 875-0, 875-1, 875-2 and 875-3 which hold cache block data 877-0, 877-1, 877-2 and 877-3 output from data arrays 870-0, 870-1, 870-2 and 870-3 of the respective banks.

Further provided are cache block data selectors 876-0, 876-1, 876-2 and 876-3 which select data 878-0, 878-1, 878-2 and 878-3 output from these hold latches 875-0, 875-1, 875-2 and 875-3 and the cache block data 877-0, 877-1, 877-2 and 877-3 output from the data arrays 870-0, 870-1, 870-2 and 870-3.

The cache memory is structured such that results selected by the cache block data selectors 876-0, 876-1, 876-2 and 876-3 become cache block data 871-0, 871-1, 871-2 and 871-3 applied to bank selection circuits 880-0 and 880-1 from the respective banks.

Next, operation involved in the above-described addition of the components will be described.

The selection control signal generation circuit 850 detects coincidence among the applied tag part coincidence determination signals 808-0 and 808-1 and index part coincidence determination signals 809-0 and 809-1. Coincidence among them here includes two cases, one where among these four signals, the tag part coincidence determination signal 808-0 and the index part coincidence determination signal 809-0 coincide with each other and the remaining two indicate lack of coincidence and the other where the tag part coincidence determination signal 808-1 and the index part coincidence determination signal 809-1 coincide with each other and the remaining two indicate lack of coincidence.

Of these two cases, the former shows that an access address as of last time and an access address as of this time are the same at the latch 10 and the latter shows that an access address as of last time and an access address as of this time are the same at the latch 11. In either case, the access addresses are the same, so that the same cache block is accessed last time and this time.

Description will be made of operation executed in such cases in the following, first with respect to the entire description and then with respect to one example.

In the above-described cases, determination can be made that the same cache block as the cache block accessed last time will be accessed. From the determination result and selector selection control signals 851-0, 851-1, 851-2 and 851-3 selected according to which bank is to be accessed by the respective access addresses 800-0 and 800-1, generate hold signals 852-0, 852-1, 852-2 and 852-3 to the respective banks.

When the hold signals 852-0, 852-1, 852-2 and 852-3 to the respective banks are generated, the data arrays 870-0, 870-1, 870-2 and 870-3 are fixed at the present state to prevent the hold latches 875-0, 875-1, 875-2 and 875-3 from being updated.

When the hold signals 852-0, 852-1, 852-2 and 852-3 are effective, the data arrays 870-0, 870-1, 870-2 and 870-3 are set at a power-save mode to refrain from executing reading processing, while the selection control signals of the cache block data selectors 876-0, 876-1, 876-2 and 876-3 are set to output the data held in the cache block data holding latches 875-0, 875-1, 875-2 and 875-3 to the bank selection circuits 880-0 and 880-1.

One example will be described next.

Assume, for example, that both the tag parts and the index parts of the access addresses as of last time and as of this time coincide with each other at the latch 10 and the bank 0 is accessed last time, and neither the tag parts nor the index parts of the access addresses as of last time and as of this time coincide with each other at the latch 11.

In this case, determination can be made that the same cache block as that of last time is accessed by the access address 800-0.

When the selector control signal 851-0 which selects the bank 0 corresponding to the access address 800-0 as of this time is generated, the hold signal 852-0 to the bank 0 is generated.

As a result, the data array 870-0 is fixed at the present state to prevent the hold latch 875-0 from being updated.

Here, the data array 870-0 is set at the power-save mode by the hold signal 852-0 to refrain from executing reading processing, while the selection control signal of the cache block data selector 876-0 is set to output the data as of last time held at the hold latch 875-0 to the bank selection control circuit 880-0.

Thus adding the components enables, in a case of executing processing of reading from the same cache block successively, reduction of power consumption by stopping operation of the data array. Since in accessing an operand cache memory, such a case is presumed to occur relatively frequently, this addition is expected to be effective.

While in the present embodiment, a hold signal is generated by comparing tag parts and index parts between access addresses of the same line, similarly comparing tag parts and index parts between access addresses of different lines also enables the number of cases where a hold signal is effective to be increased.

In addition, the data array of the present invention has such improvement in the internal structure of the SRAM to read the entire cache block by one access as illustrated in FIG. 7 as the first embodiment.

Therefore, the function constituted by the hold latches 875-0, 875-1, 875-2 and 875-3 which hold cache block data and the cache block data selectors 876-0, 876-1, 876-2 and 876-3 in the present embodiment can be replaced by providing the latch type sense amplifiers 760-0*a*, 760-1*a*, 760-0*b*, 760-1*b* . . . , 760-0*n* and 760-1*n* installed inside of the SRAM as shown in FIG. 7 with the function of keeping holding data latched in response to an external control signal.

In a case of executing processing of reading from the same cache block successively, the foregoing-described embodiment enables reduction of power consumption by stopping operation of the data array.

The reason is that, when executing processing of reading from the same cache block successively with the latches 805-0 and 805-1 and the hold latches 875-0, 875-1, 875-2 and 875-3 added, cache block reading information as of last time which is held in the hold latch is provided, with the operation of the data array stopped.

Although the present invention has been described with respect to the plurality of preferred embodiments in the foregoing, the present invention is not necessarily limited to the above-described embodiments and can be implemented in various forms within a range of its technical idea.

According to the multiport cache memory and the access control system of the multiport cache memory according to the present invention, the following effects can be obtained.

Probability of occurrence of bank contention which will occur when a plurality of reading processings are executed simultaneously can be reduced.

The reason is that in a multiport cache memory in which cache block data registered in an address array and a data array as components of the cache memory is indexed by a plurality of access addresses to simultaneously execute processing of reading target data each corresponding to each of the plurality of the access addresses, both the address array and the data array are divided into a plurality of banks which can be unitarily identified by an index part lower-order bit of the access addresses.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A multiport cache memory comprising:
   an address array in which address information of cache block data is stored; and
   a data array in which said cache block data is stored,
   wherein said stored cache block data is indexed by a plurality of access addresses to simultaneously execute read operations on target data corresponding to each of said plurality of access addresses,
   wherein each of said plurality of access addresses is divided beginning at the Most Significant Bit into a tag part, an index part and a block part, and
   wherein said address array and said data array are each divided into a plurality of banks which can be uniquely identified by a lower-order bit of said index part of said access address.

2. The multiport cache memory as claimed in claim 1, wherein said multiport cache memory is a set-associative system cache memory divided into a plurality of blocks.

3. The multiport cache memory as claimed in claim 2, wherein said multiport cache memory is an operand cache memory which stores a value to be operated and a variable.

4. The multiport cache memory as claimed in claim 2, wherein
   said plurality of banks can be independently accessed by designating a lower-order bit of said index part of said access address.

5. The multiport cache memory as claimed in claim 2, wherein
   said plurality of banks can be independently accessed by designating a lower-order bit of said index part of said access address, and
   wherein when an access bit width to said data array which is divided into said plurality of banks and a data width of cache block data which is stored in said data array is set to be the same, target data for which said read operation is requested is selected from said cache block data formed of a plurality of pieces of data.

6. The multiport cache memory as claimed in claim 5, wherein
   when indexing cache block data by said plurality of access addresses, said tag parts forming each of said plurality of access addresses are compared with each other and said index parts of said access addresses are compared with each other.

7. The multiport cache memory as claimed in claim 6, comprising
   a latch which holds information of said plurality of access addresses.

8. The multiport cache memory as claimed in claim 7, wherein when said tag parts of said plurality of access addresses are coincident with each other and said index parts of said plurality of access addresses are coincident with each other, only an access address having higher priority than priorities of the other access addresses is made effective.

9. The multiport cache memory as claimed in claim 8, wherein when an index part of said access address has higher priority as an index address than index parts of the other access addresses, cache block data is read from said data array of a bank uniquely identified by a lower-order bit of said index part.

10. The multiport cache memory as claimed in claim 9, wherein said cache block data is output from a bank selection circuit corresponding to each of said plurality of access addresses.

11. The multiport cache memory as claimed in claim 10, wherein target data is selected from said cache block data according to each block part of said plurality of access addresses.

12. The multiport cache memory as claimed in claim 7, wherein when said tag parts of said plurality of access addresses fail to coincide with each other and said index parts of said plurality of access addresses are coincident with each other, out of said plurality of access addresses, a bank is accessed which can be uniquely identified by said lower-order bit of said index part of an access address having higher priority than priorities of the other access addresses.

13. The multiport cache memory as claimed in claim 12, wherein when accessing a bank which can be uniquely identified by said lower-order bit of said index part, a plurality of sets in said bank divided based on a set-associative system are simultaneously accessed to output cache block data from a bank selection circuit provided for each set.

14. The multiport cache memory as claimed in claim 13, wherein for each of said plurality of access addresses, cache block data corresponding to each access address is selected in response to a cache hit determination signal coinciding with each tag part.

15. The multiport cache memory as claimed in claim 14, wherein from cache block data corresponding to said access address, target data corresponding to a block part of said access address is selected.

16. The multiport cache memory as claimed in claim 7, comprising:
 a latch which holds tag part information and index part information of said plurality of access addresses whose read operation has been previously executed, and
 a hold latch which holds cache block data previously output from said data array divided into said plurality of banks.

17. The multiport cache memory as claimed in claim 16, wherein
 said tag parts and said index parts of said plurality of access addresses and tag parts and index parts of a plurality of access addresses whose read operation is to be presently executed are compared with each other and a read operation from a data array corresponding to an access address whose tag part and index part coincide with said previous tag part and said previous index part is not executed.

18. The multiport cache memory as claimed in claim 17, wherein said cache block data held in said hold latch connected to said data array is output to a bank selection circuit corresponding to said access address.

19. The multiport cache memory as claimed in claim 7, wherein said data array is formed of SRAM which has a plurality of SRAM banks, each bank including a row decoder, a word line driver, a memory cell array and a latch type sense amplifier, and
 wherein said data array uses all signals passed through said plurality of latch type sense amplifiers as data array read data.

20. An access control system of a multiport cache memory comprising:
 an address array in which address information of cache block data is stored; and
 a data array in which said cache block data is stored,
 wherein said stored cache block data is indexed by a plurality of access addresses to simultaneously execute read operations of target data corresponding to each of said plurality of access addresses,
 wherein each of said plurality of access addresses is divided beginning at the Most Significant Bit into a tag part, an index part and a block part, and
 wherein said address array and said data array are each divided into a plurality of banks which can be uniquely identified by a lower-order bit of said index part of said access address, and
 each of said plurality of banks is independently accessed by designating said index part lower-order bit.

21. The access control system of a multiport cache memory as claimed in claim 20, wherein said multiport cache memory is a set-associative system cache memory divided into a plurality of blocks.

22. The access control system of a multiport cache memory as claimed in claim 21, wherein said multiport cache memory is an operand cache memory which stores a value to be operated and a variable.

23. The access control system of a multiport cache memory as claimed in claim 21, wherein when an access bit width to said data array which is divided into said plurality of banks and a data width of cache block data which is stored in said data array is set to be the same, target data for which said read operation is requested is selected from said cache block data formed of a plurality of pieces of data.

24. The access control system of a multiport cache memory as claimed in claim 23, wherein
 when indexing cache block data by said plurality of access addresses, said tag parts forming each of said plurality of access addresses are compared with each other and said index parts of said access addresses are compared with each other.

25. The access control system of a multiport cache memory as claimed in claim 24, wherein when said tag parts of said plurality of access addresses are coincident with each other and said index parts of said plurality of access addresses are coincident with each other, only an access address having higher priority than priorities of the other access addresses is made effective.

26. The access control system of a multiport cache memory as claimed in claim 25, wherein when an index part of said access address has higher priority as an index address than index parts of the other access addresses, cache block data is read from said data array of a bank uniquely identified by a lower-order bit of said index part.

27. The access control system of a multiport cache memory as claimed in claim 26, wherein said cache block data is output from a bank selection circuit corresponding to each of said plurality of access addresses.

28. The access control system of a multiport cache memory as claimed in claim 27, wherein target data is selected from said cache block data according to each block part of said plurality of access addresses.

29. The access control system of a multiport cache memory as claimed in claim 24, wherein when said tag parts of said plurality of access addresses fail to coincide with each other and said index parts of said plurality of access addresses are coincident with each other, out of said plurality of access addresses, a bank is accessed which can be uniquely identified by said lower-order bit of said index part of an access address having higher priority than priorities of the other access addresses.

30. The access control system of a multiport cache memory as claimed in claim 29, wherein when accessing a bank which can be uniquely identified by said lower-order bit of said index part, a plurality of sets in said bank divided based on a set-associative system are simultaneously accessed to output cache block data from a bank selection circuit provided for each set.

31. The access control system of a multiport cache memory as claimed in claim 30, wherein for each of said plurality of access addresses, cache block data corresponding to each access address is selected in response to a cache hit determination signal coinciding with each tag part.

32. The access control system of a multiport cache memory as claimed in claim 31, wherein from cache block data corresponding to said access address, target data corresponding to a block part of said access address is selected.

* * * * *